United States Patent
Tandai

(10) Patent No.: US 10,541,798 B2
(45) Date of Patent: Jan. 21, 2020

(54) WIRELESS DEVICE AND WIRELESS COMMUNICATION METHOD

(71) Applicant: KABUSHIKI KAISHA TOSHIBA, Minato-ku, Tokyo (JP)

(72) Inventor: Tomoya Tandai, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 52 days.

(21) Appl. No.: 15/202,998

(22) Filed: Jul. 6, 2016

(65) Prior Publication Data

US 2017/0013482 A1 Jan. 12, 2017

(30) Foreign Application Priority Data

Jul. 8, 2015 (JP) .................. 2015-136768

(51) Int. Cl.
*H04L 5/00* (2006.01)
*H04W 84/12* (2009.01)
(Continued)

(52) U.S. Cl.
CPC ....... *H04L 5/0048* (2013.01); *H04W 74/0808* (2013.01); *H04L 5/0053* (2013.01);
(Continued)

(58) Field of Classification Search
None
See application file for complete search history.

(56) References Cited

U.S. PATENT DOCUMENTS

| 7,657,276 B2 | 2/2010 | Sakoda | |
| 2007/0286122 A1* | 12/2007 | Fonseca | H04L 1/0021 370/329 |

(Continued)

FOREIGN PATENT DOCUMENTS

| JP | 2005-253047 A | 9/2005 |
| JP | 2008-17337 A | 1/2008 |

(Continued)

OTHER PUBLICATIONS

IEEE Std 802.11ac™-2013; IEEE Standard for Information technology—Telecommunications and information exchange between systems—Local and metropolitan area networks—Specific requirements, "Part 11: Wireless LAN Medium Access Control (MAC) and Physical Layer (PHY) Specifications, Amendment 4: Enhancements for Very High Throughput for Operation in Bands below 6 GHz", LAN/MAN Standards Committee of the IEEE Computer Society, IEEE-SA Standards Board, Dec. 18, 2013, 425 pages.

(Continued)

*Primary Examiner* — Gregory B Sefcheck
*Assistant Examiner* — Suk Jin Kang
(74) *Attorney, Agent, or Firm* — Foley & Lardner LLP

(57) ABSTRACT

According to one embodiment, a wireless device includes: a receiver configured to receive a first frame and a second frame; and processing circuitry. The processing circuitry is configured to determine, when a reception level of the first frame is a first threshold or more, whether a transmission source of the first frame belongs to a same wireless network as the wireless device, determine, when the transmission source of the first frame belongs to the same wireless network as the wireless device, a second threshold based on a reception level of the first frame, and perform, when a reception level of the second frame is a second threshold or more, reception processing of the second frame.

19 Claims, 18 Drawing Sheets

(51) Int. Cl.
  *H04W 74/08* (2009.01)
  *H04W 48/16* (2009.01)
(52) U.S. Cl.
  CPC ........... *H04L 5/0091* (2013.01); *H04W 48/16* (2013.01); *H04W 84/12* (2013.01)

(56) References Cited

U.S. PATENT DOCUMENTS

| | | | | |
|---|---|---|---|---|
| 2014/0050156 | A1* | 2/2014 | Chan | H04W 76/025 370/329 |
| 2015/0032868 | A1* | 1/2015 | Sung | H04L 1/203 709/221 |
| 2015/0163824 | A1* | 6/2015 | Krzymien | H04W 28/18 370/338 |
| 2015/0358904 | A1* | 12/2015 | Kwon | H04W 52/0206 370/252 |
| 2016/0037537 | A1* | 2/2016 | Xie | H04W 72/082 370/329 |
| 2016/0080954 | A1* | 3/2016 | Hedayat | H04B 17/318 370/252 |
| 2016/0128099 | A1* | 5/2016 | Liu | H04W 74/0808 370/329 |
| 2016/0143058 | A1* | 5/2016 | Son | H04B 17/318 370/329 |
| 2016/0150534 | A1* | 5/2016 | Kwon | H04W 72/0446 370/338 |
| 2016/0164646 | A1* | 6/2016 | Kwon | H04L 43/16 370/252 |
| 2016/0234879 | A1* | 8/2016 | Kwon | H04W 72/0446 |
| 2016/0353329 | A1* | 12/2016 | Kakani | H04W 24/08 |
| 2016/0353480 | A1* | 12/2016 | Choi | H04L 43/16 |
| 2016/0381688 | A1* | 12/2016 | Hedayat | H04L 27/26 370/329 |
| 2017/0127449 | A1* | 5/2017 | Wang | H04W 74/0816 |
| 2017/0164406 | A1* | 6/2017 | Son | H04W 74/0816 |
| 2017/0181189 | A1* | 6/2017 | Luo | H04W 74/08 |
| 2017/0188336 | A1* | 6/2017 | Ahn | H04W 72/04 |
| 2017/0202024 | A1* | 7/2017 | Son | H04W 74/0816 |
| 2017/0208628 | A1* | 7/2017 | Smith | H04W 74/0816 |
| 2017/0332405 | A1* | 11/2017 | Son | H04W 74/0816 |
| 2017/0359821 | A1* | 12/2017 | Zhou | H04W 72/0446 |
| 2017/0367119 | A1* | 12/2017 | Son | H04W 74/0816 |

FOREIGN PATENT DOCUMENTS

| | | |
|---|---|---|
| JP | 4710321 B2 | 6/2011 |
| JP | 2012-213199 A | 11/2012 |
| JP | 2015-115613 A | 6/2015 |
| WO | WO-2016/175328 A1 | 11/2016 |
| WO | WO-2016/175329 A1 | 11/2016 |

OTHER PUBLICATIONS

Takeshi Itagaki; "Performance Analysis of BSS Color and DSC", Sony Corporation, doc.: IEEE 802.11-15-0045r0, Jan. 12, 2015.
IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.
Stacey, Robert: "Specification Framework for TGax", IEEE 11-15-0132-05-00ax-spec-framework, Intel, May 2015, pp. 1-7.
Stacey, Robert: "Specification Framework for TGax", IEEE 11-15-0132-17-00ax-spec-framework, Intel, May 2016, pp. 1-61.
Matthew Fischer et al., Partial_Aid-color-bits, IEEE 802.11-13/1207r0, Sep. 18, 2013, URL, https://mentor.ieee.org/802.11/dcn/13/11-13-1207-00-00ah-partial-aid-color-bits.pptx.

* cited by examiner

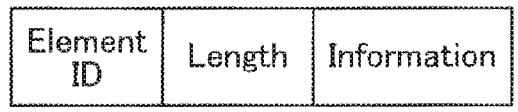
FIG. 5
| To DS | From DS | Address 1 | Address 2 | Address 3 | | Address 4 | |
|---|---|---|---|---|---|---|---|
| | | | | MSDU case | A-MSDU case | MSDU case | A-MSDU case |
| 0 | 0 | RA=DA | TA=SA | BSSID | BSSID | N/A | N/A |
| 0 | 1 | RA=DA | TA=BSSID | SA | BSSID | N/A | N/A |
| 1 | 0 | RA=BSSID | TA=SA | DA | BSSID | N/A | N/A |
| 1 | 1 | RA | TA | DA | BSSID | SA | BSSID |
FIG. 6
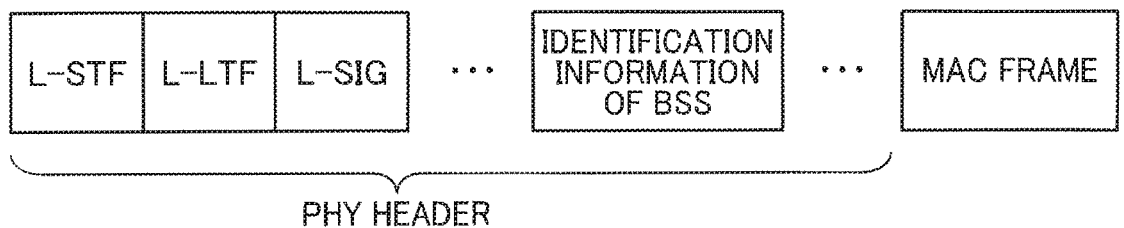
FIG. 7

WIRELESS DEVICE AND WIRELESS COMMUNICATION METHOD

CROSS-REFERENCE TO RELATED APPLICATIONS

This application is based upon and claims the benefit of priority from Japanese Patent Application No. 2015-136768, filed Jul. 8, 2015; the entire contents of which are incorporated herein by reference.

FIELD

Embodiments of the present invention relate to a wireless device and a wireless communication method.

BACKGROUND

There is a known technique called DSC (Dynamic Sensitivity Control) for increasing frequency use efficiency by appropriately switching a threshold of carrier sense (CCA (Clear Channel Assessment) threshold) according to an environment. An example of a method related to the DSC includes a method of setting the CCA threshold such that the number of terminals existing in a communication available range of a terminal is within a predetermined range. The method has a problem that when a hidden terminal exists in a same BSS (Basic Service Set) as the terminal, a throughput in the BSS is reduced.

BRIEF DESCRIPTION OF THE DRAWINGS

FIG. 5 is a diagram showing an example of format of an information element;

FIG. 6 is a diagram showing an example of a table storing content set in fields of Addresses 1 to 4;

FIG. 7 is a diagram showing an example of schematic format of a physical packet;

DETAILED DESCRIPTION

According to one embodiment, a wireless device includes: a receiver configured to receive a first frame and a second frame; and processing circuitry. The processing circuitry is configured to determine, when a reception level of the first frame is a first threshold or more, whether a transmission source of the first frame belongs to a same wireless network as the wireless device, determine, when the transmission source of the first frame belongs to the same wireless network as the wireless device, a second threshold based on a reception level of the first frame, and perform, when a reception level of the second frame is a second threshold or more, reception processing of the second frame.

Hereinafter, embodiments of the present invention will be described with reference to the drawings. The entire contents of IEEE Std 802.11™-2012 and IEEE Std 802.11ac™-2013, known as the wireless LAN specification are herein incorporated by reference in the present specification.

First Embodiment

In the present embodiment, a threshold of carrier sense (also called CCA (Clear Channel Assessment) threshold) is appropriately switched according to an environment to thereby determine the CCA threshold to eliminate generation of a so-called hidden terminal as much as possible when DSC (Dynamic Sensitivity Control) for increasing frequency use efficiency is executed. This suppresses a reduction of throughput in a BSS (Basic Service Set).

Figure 1:
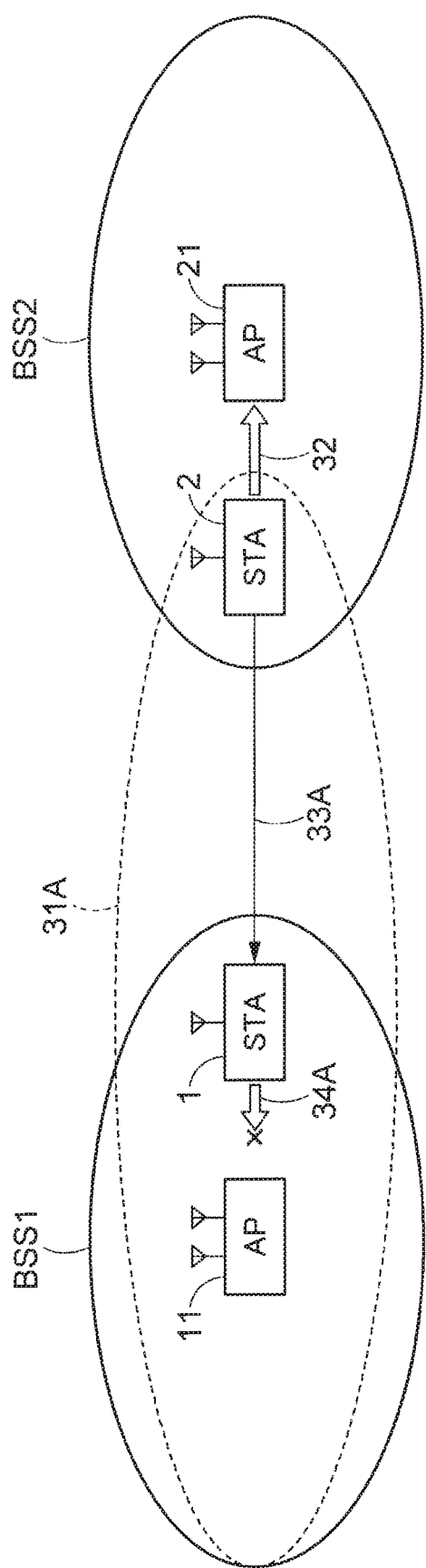
FIG. 1 is a diagram showing a wireless communication system and another wireless communication system according to a first embodiment.

FIG. 1 shows a wireless communication system according to the present embodiment. The wireless communication system includes a base station (AP: Access Point) 11 and a wireless communication terminal (STA: Station) 1 and communicates according to a standard of IEEE 802.11. However, IEEE 802.11 is an example, and communication is possible according to another standard or an arbitrary system. The base station 11 forms a BSS1, that is, a wireless network. The wireless communication terminal 1 is already connected by executing an association process with the base station 11 and belongs to the BSS1. Note that the wireless communication terminal will be called a terminal or a wireless terminal. Although the base station 11 is different from a terminal in that the base station 11 has a relay function, the base station 11 has functions similar to the terminal. Therefore, the terminal described below may include a case of a base station except when the base station is particularly distinguished from the terminal.

Another wireless communication system exists near the wireless communication system, and this wireless communication system includes a base station 21 and a terminal 2. Although the wireless communication system also communicates according to the standard of IEEE 802.11, communication is also possible according to another standard or an arbitrary system. The base station 21 forms a BSS2.

It is assumed that at least one channel (one channel in the simulation here) selected from a plurality of channels is used in the wireless communication system (BSS1), and the same channel as the BSS1 is also used in the wireless communication system (BSS2). Note that the plurality of channels are a plurality of frequency channels arranged in a frequency domain at certain frequency intervals. Although the same channel is used in the BSS1 and BSS2 here, different channels may be used, such as channels adjacent to each other, as long as signals leak between channels.

In a situation simulated below, the terminal 1 in the BSS1 includes data to be transmitted to the base station 11, and the terminal 1 is about to transmit the data. Before transmitting the data to the base station 11, the terminal 1 needs to acquire a right to access a wireless medium according to CSMA/CA (Carrier Sense Multiple Access with Carrier Avoidance). For example, carrier sense of the wireless medium is continuously performed between a preset certain period, such as DIFS/AIFS, and a randomly determined back-off time. If a CCA value (reception level of signal received from the wireless medium) is smaller than a threshold (CCA threshold), such as when an average CCA value of each certain time is smaller than the threshold, it is decided that the wireless medium is idle, and a right to access for transmitting one frame is acquired. The terminal 1 that has acquired the right to access transmits a frame including data (MAC (Medium Access Control) frame), or more specifically, a physical packet including a physical header added to a frame, as a radio signal to a space. On the other hand, if the CCA value becomes equal to or greater than the threshold during the carrier sense, such as when there is a time section in which the average CCA value of each certain time is equal to or greater than the threshold, it is assumed that the wireless medium is busy. The back-off time is terminated, and the carrier sense is performed again.

In the example of FIG. 1, an initial value provided in advance (default CCA value) is set as the CCA threshold. A range that the terminal 1 can detect signals from other terminals (signal detection range) when the CCA threshold is the initial value is a range 31A indicated by a broken line. Although −82 dBm can be used as the initial value for example, the initial value is not limited to this. In the example of FIG. 1, the terminal 2 in the BSS2 transmits the signal (reference sign 32) to the base station 21, and the terminal 1 detects the signal (see reference sign 33A) during the carrier sense of the terminal 1. The carrier sense result indicates that the wireless medium is busy (CCA result indicates busy), and the terminal 1 cannot acquire the right to access in this case (see reference sign 34A). Note that although the ranges of the BSS1 and the BSS2 do not overlap with each other, that is, coverage areas of the base station 11 and the base station 21 do not overlap with each other, a similar thing can happen even if the BSSs overlap with each other.

In the example of FIG. 1, the CCA threshold in the terminal 1 can be increased to narrow down the signal detection range of the terminal 1. In this case, when the CCA threshold is set such that the terminal 2 in the BSS2 is not included in the signal detection range of the terminal 1, the terminal 1 cannot detect the signal from the terminal 2.

Figure 2:
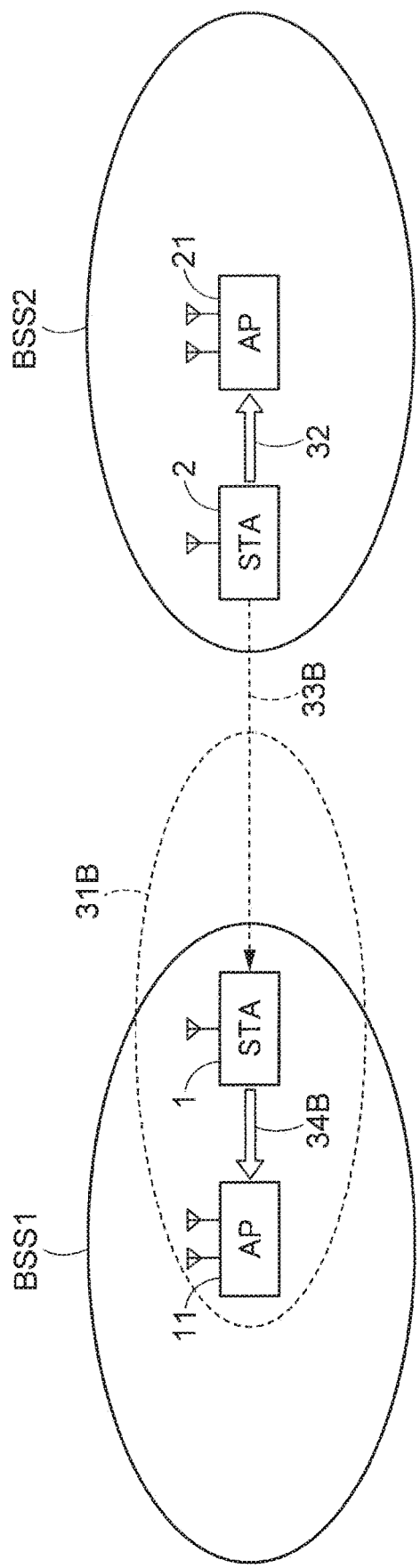
FIG. 2 is a diagram showing a state in which a CCA threshold of a terminal in the wireless communication system of FIG. 1 is increased.

FIG. 2 shows this example. When the initial value of the CCA threshold is −82 dBm, the CCA threshold can be set to, for example, −62 dBm in FIG. 2. A signal detection range 31B of the terminal 1 is narrower than the range 31A of FIG. 1, and the terminal 2 is not included in the range 31B. Although the terminal 2 transmits the signal (reference sign 32) to the base station 21 as in FIG. 1, the signal is not detected by the terminal 1 (reference sign 33B). Therefore, the terminal 1 determines that the carrier sense result indicates that the wireless medium is idle, and the terminal 1 can acquire the right to access the wireless medium to transmit the frame (reference sign 34B).

Figure 3:
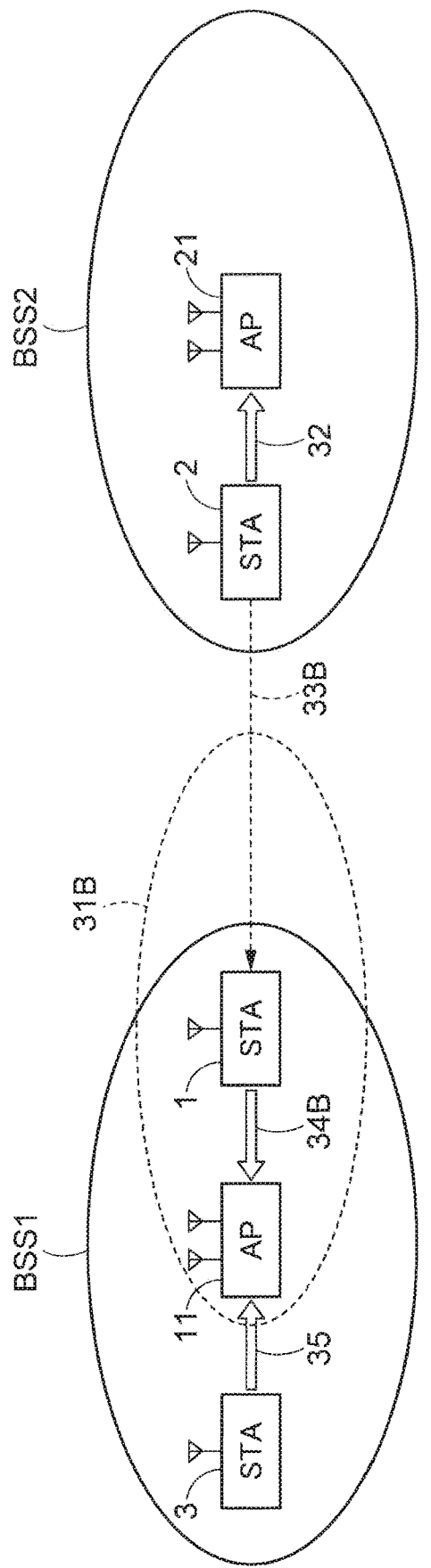
FIG. 3 is a diagram showing a condition that a terminal newly enters the wireless communication system in the situation of FIG. 2.

In the situation of FIG. 2, a situation in which a terminal newly enters the BSS1, and the terminal 1 cannot detect the signal transmitted by the terminal will be considered. FIG. 3 shows the situation. A terminal 3 newly enters the BSS1. Although the terminal 1 belongs to the same BSS as the terminal 3, the terminal 1 cannot detect the signal transmitted by the terminal 3. In this way, the terminal belonging to the same BSS, but from which the transmitted signal cannot be detected, is called a hidden terminal. Although the terminal 1 and the terminal 3 belong to the same BSS1 in FIG. 3, the terminal 3 is a hidden terminal for the terminal 1, because the signal transmitted by the terminal 3 does not reach the terminal 1, that is, because the terminal 3 is not included in the signal detection range 31B of the terminal 1. Since the terminal 1 cannot detect the signal transmitted from the terminal 3 when the carrier sense (CCA process) is performed as in FIG. 2, the terminal 1 decides that the carrier sense result indicates that the wireless medium is idle and transmits the frame to the base station 11. Meanwhile, it is assumed that the terminal 3 also starts transmitting the frame to the base station 11 (reference signal 35) at the same time as or before or after the terminal 2. The base station 11 receives the signal of the frame transmitted from the terminal 1 and the signal from the terminal (hidden terminal) 3 at the same time, and the signals collide.

In this case, the base station 11 detects a reception error in one or both of a physical layer and a MAC layer. Since a delivery confirmation response frame is not returned from the base station 11, the terminal 1 or the terminal 3 decides that the transmission has failed and attempts the transmission again.

In this way, the CCA threshold of the terminal 1 in the BSS1 can be changed to prevent detecting a signal from another network (BSS2), and the throughput can be improved. However, the existence of the hidden terminal suppresses the improvement of the throughput in the network. The present embodiment solves this problem. One of the features of the present embodiment is that the terminal (such as the terminal 1) sets the CCA threshold as high as possible, the CCA threshold preventing as much as possible the generation of the hidden terminal in the BSS that the terminal belongs. In this way, the possibility of detecting a signal from another network is reduced, and a reduction in the throughput that can be caused by the hidden terminal is suppressed. The present embodiment will be described in more detail.

Figure 4:
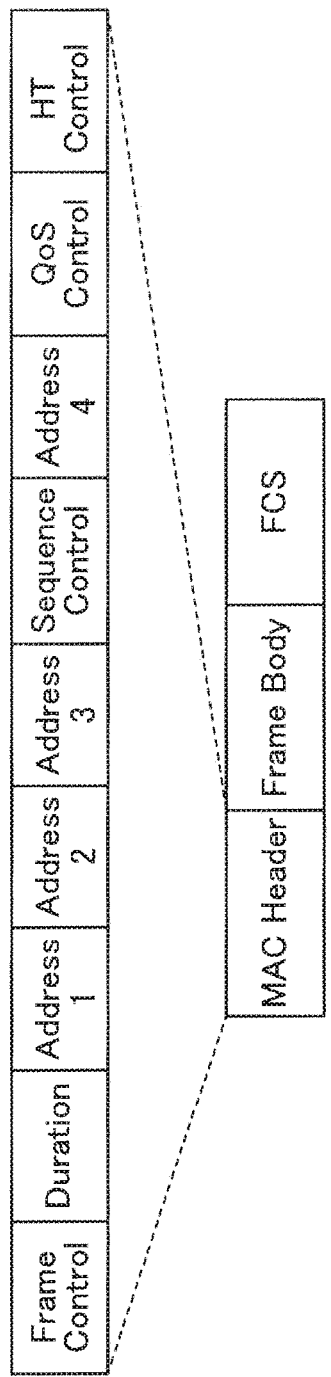
FIG. 4 is a diagram showing an example of basic format of a MAC frame.

FIG. 4 shows an example of a basic format of the MAC frame in the present embodiment. Examples of the types of frames transmitted and received in the system according to the present embodiment include a data frame, a management frame, and a control frame. The frames basically have a frame format shown in FIG. 4. The data frame, the management frame, and the control frame will be simply described.

The management frame is used for managing a communication link (wireless link) with another terminal. Note that a state in which a terminal has exchanged information necessary for carrying out wireless communication with another terminal will be expressed that the communication link is established. An example of the management frame includes a beacon (Beacon) frame for reporting attributes and synchronization information of a group to form a BSS (wireless communication group). Other examples of the management frame include an association request frame (Association Request frame) used in an association process that is one of procedures for the terminal to execute authentication with the base station and a reassociation request frame (Reassociation Request frame) used in a reassociation process. Other examples of the management frame include a probe request frame (Probe Request frame) and a probe response frame (Probe Response frame) that is a response to the probe request frame. The data frame is used to transmit data to another terminal in a state that the communication link is established with the terminal. The control frame is used for controlling transmission and reception (exchange) of the management frame and the data frame to and from another terminal. Examples of the control frame include an RTS (Request to Send) frame and a CTS (Clear to Send) frame exchanged with another wireless communication device to reserve a wireless medium before the start of the exchange of the management frame and the data frame. Another example of the control frame includes a delivery confirmation response frame for delivery confirmation of the received management frame and data frame. Examples of the delivery confirmation response frame include an ACK (Acknowledgement) frame and a BA (BlockACK) frame. The CTS frame is transmitted as a response to the RTS frame, and the CTS frame can also be called a type of the frame indicating the delivery confirmation response.

The frame format of FIG. 4 includes fields of a MAC header (MAC header), a frame body (Frame body), and an FCS.

The MAC header includes fields of Frame Control, Duration, Address 1, Address 2, Address 3, Sequence Control, Address 4, QoS Control, and HT (High Throughput) control. Not all of the fields have to exist, and some of the fields may not exist. Other fields not shown in FIG. 4 may also exist.

A receiver address (Receiver Address; RA) is put into the Address 1 field, and a transmitter address (Transmitter Address; TA) is put into the Address 2 field. A BSSID (Basic Service Set Identifier) that is an identifier of the BSS (may be wildcard BSSID for putting "1" into all bits and targeting all BSSIDs), a TA, or the like is put into the Address 3 field according to the usage of the frame. Note that the BSSID usually coincides with the MAC address of the base station. The BSSID or the like is put into the Address 4 field. The Address 4 field is used for communication between base stations and the like, and the Address 4 field may not exist. Details of the fields will be described later.

Two fields, a type (Type) and a subtype (Subtype), are set in the Frame Control field. The data frame, the management frame, the control frame are classified in the Type field, and smaller types of the classified frames, such as a BA frame, a BAR frame, and a Beacon frame in the management frame, are identified in the Subtype field.

A medium reservation time is set in the Duration field, and when a MAC frame addressed to another terminal is received, it is judged that the medium is virtually busy throughout the medium reservation time from the end of the physical packet including the MAC frame. A mechanism for judging that the medium is virtually busy or a period that the medium is virtually busy is called an NAV (Network Allocation Vector). The QoS Control field is used for performing QoS control, in which the priority of the frame is taken into account to perform the transmission. The HT Control field is a field added in IEEE 802.11n. FCS (Frame Check Sequence) information that is a checksum code for detecting an error of the frame on the reception side is set in the FCS field. An example of the FCS information includes a CRC (Cyclic Redundancy Code).

Note that in the management frame, an information element (Information element; IE) is set in the Frame Body field. For the information element, one or a plurality of information elements provided with specific Element IDs (Identifiers) can be set. As shown in FIG. 5, the information element includes fields of an Element ID field, a Length field, and an information (Information) field. The information element is identified by the Element ID. The Length field stores the length of the information field, and the information field stores information to be notified.

The content of the addresses set in the fields of Address 1, Address 2, Address 3, and Address 4 varies depending on whether the frame is transmitted to the base station or transmitted from the base station, whether the frame is an MSDU (MAC Service Data Unit) or an A-MSDU (A(Aggregated)-MSDU), and so forth. Here, the MSDU denotes data (frame body part) in the MAC frame that is an MPDU (Medium access control (MAC) Protocol Data Unit). The A-MSDU denotes a configuration in which the MSDUs that are a plurality of data payloads are conjunct in the frame body of one MPDU. The expression, such as MSDU, A-MSDU, and MPDU, is a way of calling in the IEEE 802.11 standard.

FIG. 6 shows an example of a table showing the content set in the fields of Address 1, Address 2, Address 3, and Address 4. The table is extracted from IEEE 802.11 specifications. The number and definition of the Address fields defined in the frame header may vary according to the type or standard of the protocol used, and in that case, the content of the addresses set in the Address fields do not have to follow the table.

A "To DS" bit and a "From DS" bit in the table of FIG. 6 correspond to bits set in subfields of To DS and From DS of the Frame Control field. A bit "1" is set in "To DS" when the frame is to be transmitted to the base station, and a bit "0" is set in other cases. A bit "1" is set in "From DS" when the frame is to be transmitted from the base station, and "0" is set in other cases.

A setting example of an uppermost line ("To DS"=0, "From DS"=0) indicates a frame directly transmitted from a terminal to another terminal in the same BSS. In this case, the address (MAC address) of the terminal (the other terminal) that is the direct destination of the transmitted frame is set for the receiver address (Receiver Address; RA) in the Address 1 field. Other than the address of the terminal (unicast address), a broadcast address or a multicast address may be set for the RA (the same applies hereinafter). In the Address 2 field, an SA (Source Address) is set for the transmitter address (Transmitter Address; TA). The SA is an address of the terminal that is the first transmitter at the start of forwarding of the frame. Here, the SA is the address of the terminal. The BSSID (Basic Service Set IDentifier) (may be wildcard BSSID for putting "1" into all bits and targeting all BSSIDs) that is the identifier of the BSS is set in the Address 3 field. The Address 4 field is not used.

A setting example of a second line ("To DS"=0, "From DS"=1) indicates a frame transmitted from a base station (BSS) to a terminal belonging to the base station (BSS). In this case, the address (MAC address) of the terminal of the receiver is set for the RA in the Address 1 field. In the Address 2 field, the BSSID of the base station that is the transmitter is set for the TA. The SA (Source Address) or the BSSID is set in the Address 3 field according to whether the frame includes the MSDU or the A-MSDU. The Address 4 field is not used.

A setting example of a third line ("To DS"=1, "From DS"=0) indicates a frame transmitted from a terminal belonging to a base station (BSS) to the base station. In this case, the BSSID of the base station that is the receiver is set for the RA in the Address 1 field. In the Address 2 field, the SA, that is, the address (MAC address) of the terminal, is set for the TA. In the Address 3 field, a DA (Destination Address) or the BSSID is set according to whether the frame includes the MSDU or the A-MSDU. The DA is the address of the terminal at the destination where the frame is ultimately forwarded. The Address 4 field is not used.

A setting example of a fourth line ("To DS"=1, "From DS"=1) denotes a frame of communication between base stations (BSSs). In this case, the BSSID of the base station that is the receiver is set for the RA in the Address 1 field. In the Address 2 field, the address (MAC address) of the base station that is the transmitter is set for the TA.

In the Address 3 field, the DA (Destination Address) or the BSSID is set according to whether the frame includes the MSDU or the A-MSDU. The SA or the BSSID is set in the Address 4 field according to whether the frame includes the MSDU or the A-MSDU.

In the present embodiment, the Address fields are used to decide whether the transmitter of the frame is in the same BSS as the terminal. For example, if the value (TA) of the Address 2 field coincides with the BSSID of the BSS that the terminal belongs, it can be determined that the transmitter of the frame is a terminal in the same BSS as the terminal. If the value of the Address 3 field coincides with the BSSID of the BSS that the terminal belongs, it can be determined that the transmitter of the frame is a terminal in the same BSS as the terminal. However, in the communication between base stations (when "To DS"=1, "From DS"=1), a condition that the value (TA) of the Address field 2 coincides with the MAC address of the base station that the terminal is connected can be further added. In the transmission from the terminal to the base station ("To DS"=1, "From DS"=0), it can be determined that the transmitter of the frame is a terminal in the same BSS as the terminal when the value (RA) of the Address 1 field coincides with the MAC address of the base station that the terminal is connected. Whether the transmitter of the frame is a terminal (including a case of a base station) in the same BSS as the terminal may be decided by a method other than the method described above.

Instead of the header of the MAC frame, the physical header added to the MAC frame can be used to decide whether the transmitter of the frame (transmitter of the physical packet) is a terminal (including a case of a base station) in the same BSS as the terminal. For example, the BSSID of the BSS that the terminal of the transmitter belongs may be set in the physical header of the physical packet, and the physical header may be used. FIG. 7 shows a schematic example of format of the physical packet. The physical header (PHY header) is added to a leading side of the MAC frame. The physical header includes an L-STF (Legacy-Short Training Field), an L-LTF (Legacy-Long Training Field), an L-SIG (Legacy Signal Field), and other fields. A field storing information (may be the BSSID or may be another value that allows identification) for identifying the BSS of the transmitter is included as one of the other fields or as a subfield of the field. Information for identifying the BSS that the terminal transmitting the frame belongs is set in the field. Information of signal detection, frequency correction, transmission speed, and the like is stored in the L-STF, the L-LTF, and the L-SIG. Specifically, BSS color information of the physical header introduced in IEEE 802.ah can be used. In a BSS color field, information of the BSS that the terminal of the transmitter belongs is set in the BSS color field of the physical header in the terminal (including a case of a base station) transmitting the physical packet. A different value is provided as the color information to each BSS. Therefore, the field can be used to decide whether the transmitter of the frame is a terminal in the BSS that the terminal belongs.

Figure 8:
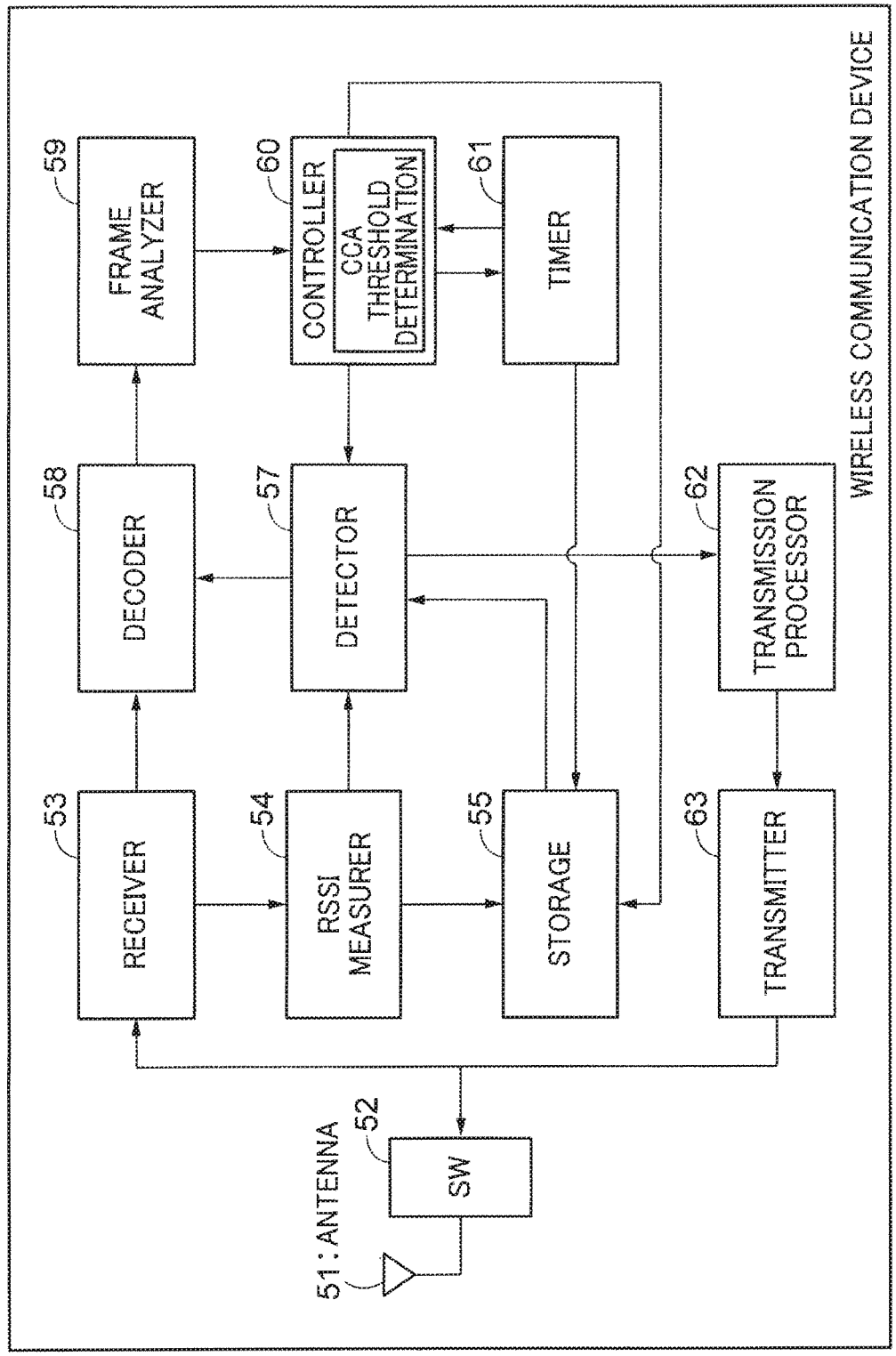
FIG. 8 is a functional block diagram of a wireless communication device mounted on a terminal.

FIG. 8 is a functional block diagram of a wireless communication device (or a wireless device) mounted on a terminal (terminal that is not a base station) according to the present embodiment.

The wireless communication device of the terminal includes one or a plurality of antennas 51, a transmission/reception change-over switch 52, a receiver 53, an RSSI measurer 54, a storage 55, a detector 57, a decoder 58, a frame analyzer 59, a controller 60, a timer 61, a transmission processor 62, and a transmitter 63.

The transmission/reception change-over switch 21 connects the antenna 51 to one of the receiver 53 and the transmitter 63 based on an instruction of the controller 60. At the reception, the antenna 51 is connected to the receiver 53, and a signal received through the antenna is input to the receiver 53. At the transmission, the antenna is connected to the transmitter 63, and a signal output from the transmitter 63 is transmitted through the antenna 51.

The receiver 53 converts the signal received from the antenna 51 from a radio frequency to a baseband and extracts a signal of a corresponding channel from the baseband signal through an analog filtering process. A signal of which channel is to be extracted is instructed by the controller 60. The receiver 30 applies a process, such as AD conversion, to the extracted signal to acquire a digital baseband signal. Note that the filtering process may be performed by digital processing after the acquisition of the digital baseband signal.

The RSSI measurer 54 measures received power (RSSI) as a reception level of the digital baseband signal and outputs a measured value to the detector 57. The detector 57 compares the CCA threshold read from an area (CCA threshold storage area) where the CCA threshold is stored in the storage 55 and the measured value to detect whether the wireless medium (CCA) is busy or idle and outputs carrier sense information indicating busy/idle to the decoder 58. When the carrier sense information indicates that the wireless medium is busy, the decoder 58 performs reception judgment of frame to judge whether a frame (more specifically, physical packet) is detected. When the frame is detected, the decoder 58 processes the header (physical header) of the physical packet. The RSSI measurer 54 writes, in the storage 55, the measured RSSI when the frame is detected, as a value indicating the reception level of the frame. Note that the RSSI of the frame may be received power or average received power of a section of part of the received physical packet, may be received power or average received power of the entire frame, or power determined by another standard may be adopted. For example, part or all of the L-STF, part or all of the L-LTF, or part or all of both of the L-STF and the L-LTF may be used to perform the measurement. An example of the part that can be measured includes an RSSI of a waveform equivalent to 10 FDM symbols. The RSSI measurer 54 may internally or externally include a buffer for temporarily storing values being measured. The buffer may be a memory or may be an SSD (Solid State Drive), a hard disk, or the like. When the buffer is a memory, the memory may be a volatile memory, such as an SRAM and a DRAM, or a non-volatile memory, such as a NAND and an MRAM.

The decoder 58 acquires a frame (MAC frame) by decoding the data field of the physical packet (including decoding and demodulation of error correcting code) according to a code modulation system included in the physical header. The decoder 58 sends the acquired frame to the frame analyzer 59.

The frame analyzer 59 analyzes the frame input from the decoder 58. For example, the frame analyzer 59 performs an error check (such as CRC check) based on the value of the FCS field of the frame. When an error is detected, the frame analyzer 59 determines that the frame is not normally received and discards the frame.

When an error is not detected, the frame analyzer 59 determines that the frame is normally received and analyzes the MAC header. For example, the frame analyzer 59 judges the type of the frame based on the type and the subtype of the Frame Control field of the frame. For example, the frame analyzer 59 judges whether the frame is a management frame, a control frame, or a data frame based on the type. Alternatively, based on the subtype, the frame analyzer 59 judges a more detailed type among the types of the judged frame. In this way, the frame analyzer 59 distinguishes a beacon frame, an association request frame, an association response frame, and the like if the frame is a management frame. If the frame is a control frame, the frame analyzer 59 distinguishes an RTS frame, a CTS frame, a BA frame, an ACK frame, and the like. If the frame is a data frame, the frame analyzer 59 distinguishes data, QoS data, null data, and the like. The frame analyzer 59 also determines a value of an NAV (Network Allocation Vector: transmission suppression period) based on the medium reservation time set in the Duration field (if it exists) of the frame. The frame analyzer 59 also detects the value of each Address field. The frame analyzer 59 sends the information obtained by the frame analysis and the information stored in the body field of the frame to the controller 60.

The controller 60 controls the communication and controls the operation in the device based on one or both of the information input from the frame analyzer 59 and an instruction from an upper layer not shown. The controller 60 may be configured by processing circuitry or controlling circuitry such as a processor.

The transmission processor 62 executes a transmission process including generation of a frame instructed from the controller 60 (more specifically, generation of a physical packet including the frame) and control of transmission of the frame (more specifically, the physical packet). The transmission processor 62 generates the frame according to the instruction of the controller 60, acquires the right to access the wireless medium according to the CSMA/CA based on the carrier sense information regarding busy/idle of the channel output from the detector 57, and outputs the frame. The right to access may be acquired through transmission of the RTS frame and reception of the CTS frame. In this case, the transmission processor 62 also has to acquire the right to access the wireless medium according to the CSMA/CA based on the carrier sense information in order to transmit the RTS frame. In the NAV period, the transmission processor 62 controls and suppresses the transmission.

The transmitter 63 applies coding, modulation, DA (Digital-Analog) conversion, gain control, band limiting according to the used channel, frequency conversion, and the like to the frame (more specifically, physical packet) input from the transmission processor 62 to form an analog signal. The transmitter 63 amplifies the analog signal and transmits a radio signal to the space from the antenna 51.

The controller 60 manages the information regarding the channel processed by the transmitter 63 and the receiver 53. The controller 60 provides the transmitter 63 and the receiver 53 with an instruction of the channel to be processed, and the receiver 53 and the transmitter 63 perform internal setting of the filter and the like as necessary according to the instructed channel and perform the operation regarding the reception and the transmission.

The controller 60 controls setting of a timer value (period) and activation of the timer 61. Once the controller 60 sets the period and activates the timer 61, the timer 61 counts time until after the set period. When the set period times out, the timer 61 outputs a time-out signal to one or both of the controller 60 and the storage 55.

The storage 55 stores various information necessary for communication, information to be transmitted to the base station, and information received from the base station. An example of the information necessary for communication includes the CCA threshold.

The controller 60 can read and write information to and from the storage 55. The detector 57 can read the CCA threshold stored in the storage 55. Note that a buffer for storing the CCA threshold may be separately arranged. The CCA threshold may be stored in the buffer, and the detector 57 may read the CCA threshold. The buffer may be arranged in the detector 57. The buffer may be a memory or may be an SSD (Solid State Drive), a hard disk, or the like. When the buffer is a memory, the memory may be a volatile memory, such as an SRAM and a DRAM, or a non-volatile memory, such as a NAND and an MRAM.

Although the storage 55 is provided outside of the controller 60, the buffer that stores part or all of the information stored in the storage 55 may be provided in the controller 60 or may be arranged outside of the device. One or both of the storage 55 and the buffer may be memories or may be SSDs (Solid State Drives), hard disks, or the like. When one or both of the storage 55 and the buffer are memories, the memories may be volatile memories, such as SRAMs and DRAMs, or non-volatile memories, such as NANDs and MRAMs.

An example of operation of the controller 60 will be illustrated. The controller 60 executes a process for connection to the base station when the device is activated or when a connection instruction is input by the user. Specifically, the controller 60 executes an association process, such as transmission of an association request frame and reception of an association response frame, through the transmission processor 62 to exchange information necessary for the communication with the base station. The controller 60 stores the acquired information in the storage 55. When the controller 60 decides that the received frame is a data frame addressed to the terminal based on the analysis result of the MAC header, the controller 60 outputs the data stored in the frame body field of the data frame to a higher processor not shown, as necessary. If the received frame is a management frame, the controller 60 extracts the information from the body field of the frame and manages the communication. When a beacon frame is received as the management frame, the controller 60 detects the BSSID or the MAC address of the base station, information regarding the attributes of the BSS, and the like. If the received frame is a control frame, the controller 60 performs operation according to the type of the control frame. For example, if the received frame is an RTS frame, the controller 60 instructs the transmission processor 62 to generate and transmit a CTS frame to transmit the CTS frame after an SIFS. The controller 60 transfers information necessary to generate the CTS frame to the transmission processor 62. The controller 60 also outputs, to the transmission processor 62, an instruction for generating and transmitting a frame (delivery confirmation response frame) indicating a delivery confirmation response depending on whether the received frame is a frame requiring the delivery confirmation response and whether the reception of the frame is successful. Examples of the delivery confirmation response frame include an ACK frame and a BA frame. The BA frame is used when an aggregation frame (A-MPDU) is received, for example. The BA frame includes information indicating whether each frame included in the aggregation frame is successful.

The controller 60 executes a process (CCA threshold determination process) for determining the threshold (CCA threshold) used for the CCA process by the detector 57. In the CCA threshold determination process, the controller 60 first determines a period for executing the process and executes the present process in the determined period. In this regard, the controller 60 sets the length of the determined period in the timer 61 and activates the timer 61. The controller 60 executes the present process until the timer 61 times out. The value of the length of the period can be determined by an arbitrary method. For example, the length of the period may be determined based on beacon intervals transmitted by the base station. The length of the period may also be determined based on a value randomly determined from a predetermined value range. Alternatively, information indicating the length of the period may be received from the base station, and the length of the period may be determined according to the information. The length of the period may be determined by methods other than the methods described here.

In the present process, the controller 60 checks whether the transmitter of the received frame is in the same BSS as the device (may be expressed as the BSS including the controller 60), that is, whether the frame is a frame transmitted from a terminal in the same BSS. An example of the method of checking includes a method of using various Address fields described above. When the physical header includes a field storing the information for identifying the BSS, the field may be used instead. In this case, the controller 60 may directly acquire the value of the Address field or the physical header field from the decoder 58 or may acquire the value of the field through the frame analyzer 59 or another block.

The controller 60 also controls the RSSI measurer 54 to store the RSSI of the received frame in the storage 55. The RSSI measurer 54 stores the measured RSSI in the storage 55. When the received frame is a frame (target frame) transmitted from within the BSS including the controller 60, the controller 60 detects the RSSI at the reception of the target frame from the storage 55. Note that the receiver of the target frame may be arbitrary, and the receiver may or may not be the device. The correspondence between the target frame and the RSSI of the target frame may be detected by any method. For example, when the RSSI measurer 54 writes the RSSI in a predetermined area in the storage 55, and the controller 60 decides that the target frame is received, the controller 60 reads the RSSI from the predetermined area to detect the RSSI of the target frame and stores and manages the correspondence relationship in another area in the storage 55. When the decoder 58 detects a frame error (such as a CRC error), the controller 60 does not perform anything for the predetermined area (or deletes the predetermined area) and overwrites the RSSI in the predetermined area in the next writing by the RSSI measurer 54. Obviously, the correspondence between the target frame and the RSSI can be attained by methods other than the method described here. In the present process, the controller 60 may handle the smallest RSSI among the target frames received up to this point as a minimum RSSI and manage the minimum RSSI in the storage 55. The controller 60 can also be configured to delete the RSSIs other than the minimum RSSI among the RSSIs of the target frames. When the timer 61 times out, the controller 60 determines the CCA threshold based on the minimum RSSI obtained in the process.

For example, the controller 60 subtracts a margin from the minimum RSSI and sets the value as the CCA threshold. A value set in advance to a certain value by the system, the base station, or the standard may be used as the margin. Fluctuations of the received power caused by shadowing is taken into account in the margin. The margin can be subtracted to reduce the CCA threshold compared to when the minimum RSSI is set as the CCA threshold, and a signal from the terminal with the minimum RSSI can be surely detected. Alternatively, the minimum RSSI may be set as the CCA threshold, or a value obtained by multiplying the RSSI by a certain coefficient may be set as the CCA threshold. A predetermined function with the RSSI as an input may be used, and a value obtained by calculating the function based on the minimum RSSI may be determined as the CCA threshold. Alternatively, a table or a database associating the RSSI and the CCA threshold may be stored in a storage device accessible from the controller 60, and the CCA threshold corresponding to the minimum RSSI in the table may be determined. Alternatively, a table or a database associating the range of the RSSI and the CCA threshold may be stored in a storage medium, and the CCA threshold corresponding to the range that the minimum RSSI belongs may be determined in the table. The CCA threshold determined in the present step may be reported to the user through a display device, such as a display, or through message transmission, such as email, and the user may be able to change the CCA threshold. Note that the storage device may be a memory or may be an SSD (Solid State Drive), a hard disk, or the like. When the buffer is a memory, the memory may be a volatile memory, such as an SRAM and a DRAM, or may be a non-volatile memory, such as a NAND and an MRAM.

The controller 60 overwrites the determined CCA threshold in the CCA threshold storage area of the storage 55. The detector 57 reads the updated CCA threshold from the CCA threshold storage area and hereafter uses the CCA threshold to execute the CCA process (carrier sense).

Determining the CCA threshold by using only the minimum RSSI is just an example, and other methods are also possible. For example, when the target frame corresponding to the minimum RSSI is a Disassociation frame or one of the frames transmitted and received in the Disassociation process, it is expected that the terminal that has transmitted the target frame will withdraw from the BSS. In this case, it is unlikely that the terminal becomes a hidden terminal, and the second smallest RSSI can be used. When there are a plurality of target frames transmitted by the same transmitter in the BSS, the RSSI may be averaged on the basis of the transmitter. In this case, the smallest RSSI among the averaged RSSIs (RSSI of one target frame when the transmitter transmits only one target frame) may be used.

All or part of the detector 57, the decoder 58, the frame analyzer 59, the controller 60, and the transmission processor 62 correspond to a communication processing device, a wireless communication integrated circuit, or a baseband integrated circuit of the present embodiment. All or part of the processes of the digital areas of these components or the process of the communication processing device may be executed by software (program) operated on a processor, such as a CPU, may be executed by hardware, or may be executed by both of the software and the hardware. The terminal may include a processor that executes all or part of the processes by the components or the process by the communication processing device.

Figure 9:
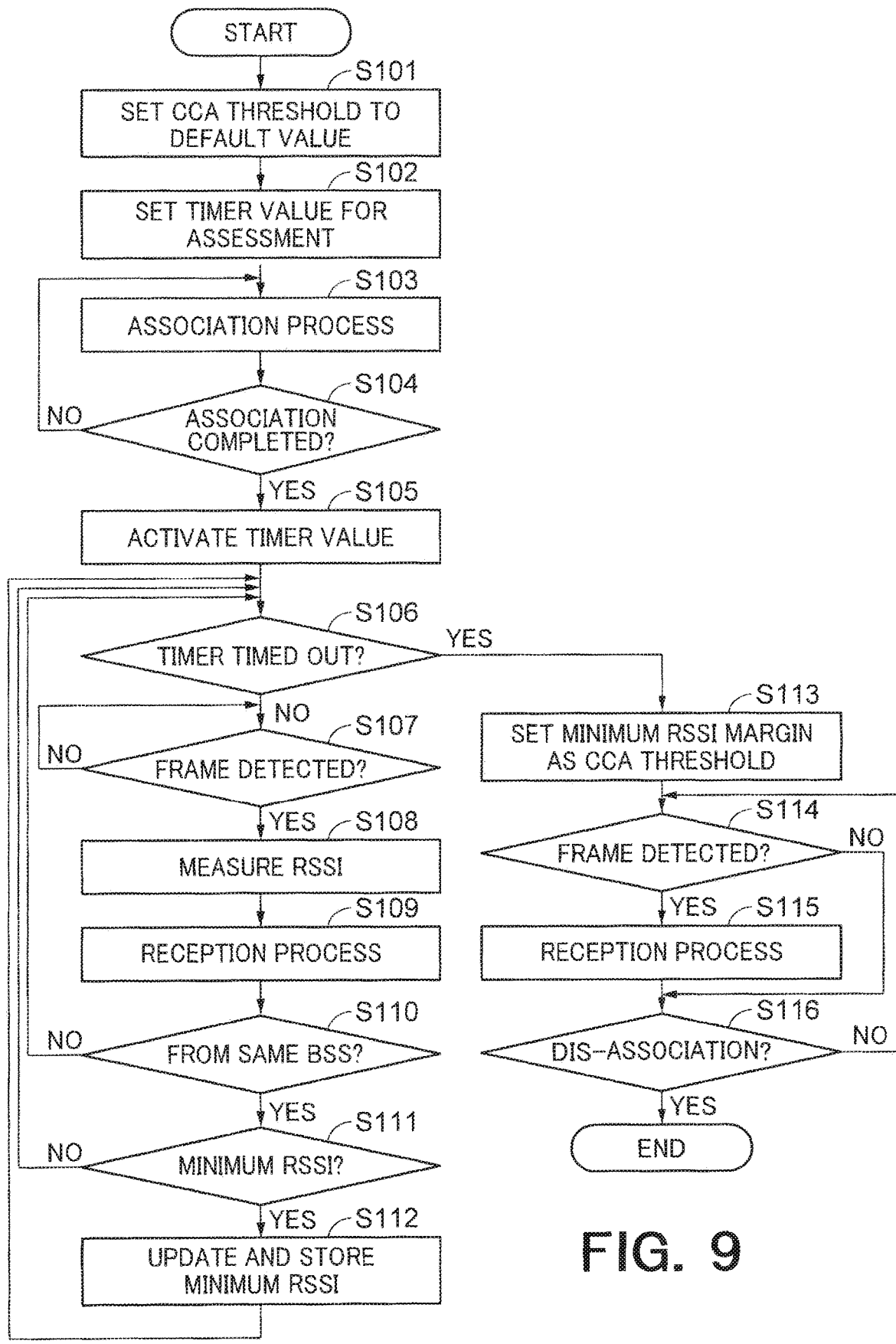
FIG. 9 is a diagram showing a flow chart illustrating an example of operation of the terminal.

FIG. 9 shows a flow chart of an example of operation of the terminal according to the present embodiment. In the example of operation, the terminal determines the CCA threshold based on the frame transmitted from within the same BSS as the terminal and executes the subsequent CCA process (carrier sense) based on the determined CCA threshold.

The terminal starts the operation of the present flow when a preset trigger is generated, such as at the activation and at the reception of an instruction for validating the wireless communication function from the user. The start trigger of the operation of the present flow is not limited to these, and for example, the operation of the present flow may be performed every certain time. Performing the operation every certain time can determine an appropriate CCA threshold even when a new terminal joins the BSS. When the operation of the present flow is started, the CCA threshold is first set to the default value (S101). Although an example of the default value includes −82 dBm, the default value is not limited to this. Note that the default value does not have to be fixed, and different levels may be used according to the PHY schemes handled by the terminal (for example, modulation scheme and coding scheme, such as OFDM and spread spectrum) or according to the bandwidths of the signals, such as 20 MHz, 40 MHz, and 80 MHz. The CCA threshold used when a signal of a PHY scheme handled by the terminal is received and the CCA threshold used when a signal of a PHY scheme not handled by the terminal is received can be different. For example, when a signal of a PHY scheme not handled by the terminal is received (when the PHY scheme cannot be discriminated from the reception signal), a value 20 dB higher than a minimum modulation and coding rate sensitivity at the channel intervals used in the wireless communication scheme can be set as the CCA threshold. A case in which a signal of a PHY scheme handled by the terminal is received is simulated in the description of the present embodiment.

The terminal determines the length of the period for executing the process for determining the CCA threshold and sets the determined value in the timer (assessment timer setting) (S102). At this point, the value is just set in the timer, and the timer is not activated yet. Next, the terminal executes the association process with the base station and establishes a wireless link with the base station (S103 and S104). As a result, the terminal belongs to the BSS that the base station belongs, and the terminal can communicate with the base station or with another terminal through the base station. Note that the terminal receives the beacon frame transmitted every certain time from the base station and detects the attribute information and the like regarding the base station and the BSS based on the beacon frame.

The terminal activates the timer provided with the value in step S102 (S105). The terminal decides whether the timer has timed out (S106), and if the timer has not timed out, the terminal determines whether a frame is detected (S107). More specifically, when busy information according to the RSSI of the signal received through the antenna and according to the default CCA threshold is received, the terminal decides whether the received signal is a physical packet including a frame. For example, the terminal may decide whether the physical packet is received based on whether a preamble of the header of the physical packet coincides with a known pattern, or the terminal may decide whether the physical packet is received based on fluctuations or the like of an amplitude value of the received signal. The terminal may use other methods to decide whether the physical packet is received.

When the physical packet is received, the terminal uses the preamble or the like of the physical header to measure the RSSI of the frame (more specifically, RSSI of the physical packet) (S108). Note that when the RSSI used to detect the frame can be used as the RSSI of the frame, the present step is not necessary. Note that when the timer has timed out during the process of steps S107 to S112, the process may mandatorily move to step S113, or the process may continue until the process advances to step S106 of the next time.

Next, the terminal decodes the data field of the physical packet to acquire the frame and analyzes the header (MAC header) of the frame (S109). Based on the values of the Address fields and the like of the header, the terminal decides whether the frame is a frame transmitted from within the same BSS as the terminal (S110). In the example of the table shown in FIG. 6, the terminal can decide that the frame with "To DS"=0 and "From DS"=0 is a frame transmitted from within the same BSS as the terminal if the value of the Address 3 field coincides with the BSSID of the BSS that the terminal belongs, as described above. The terminal can decide that the frame with "To DS"=0 and "From DS"=1 is a frame transmitted from within the same BSS as the terminal if the value (TA) of the Address 2 field coincides with the BSSID of the BSS that the terminal belongs. The terminal determines that the frame with "To DS"=1 and "From DS"=0 is a frame transmitted from within the same BSS as the terminal if the value (RA) of the Address 1 field coincides with the BSSID of the BSS that the terminal belongs. The terminal can determine that the frame with "To DS"=1 and "From DS"=1 is a frame transmitted from within the same BSS as the terminal if the value (TA) of the Address 2 field coincides with the BSSID of the BSS that the terminal belongs. A deciding method other than the method described here can also be considered.

If the frame is not transmitted from within the same BSS as the terminal, the process returns to step S106, and whether the timer has timed out is decided. On the other hand, if the frame is transmitted from within the same BSS as the terminal, whether the RSSI measured in step S108 is the smallest RSSI (minimum RSSI) among the RSSIs measured after the start of the present CCA threshold determination process is determined (S111). If the RSSI is the minimum RSSI, the minimum RSSI stored in the storage 55 (smallest RSSI among the RSSIs measured in the previous measurements) is updated to the minimum RSSI, and the process returns to step S106.

If the terminal decides that the timer has timed out in step S106, the terminal determines the CCA threshold based on the minimum RSSI stored in the storage 55. For example, the terminal subtracts a margin from the minimum RSSI and determines the value as the CCA threshold. Methods other than the method described here can be used for the CCA threshold as described above.

Once the terminal determines the CCA threshold, the terminal hereafter uses the CCA threshold in the busy/idle judgement of the carrier sense of the wireless medium. For example, if the terminal detects a signal with the received power (CCA value) equal to or greater than the CCA threshold and decides that a physical packet of the PHY scheme handled by the terminal is detected (S114), the terminal executes a reception process of the frame in the physical packet (such as decoding of the data field and analysis of the MAC header of the frame obtained by decoding) (S115). The terminal decides whether to disconnect with the base station, and if the connection is not to be cut yet, the terminal returns to step S114. If the connection is to be disconnected, the terminal executes a connection cancel process (Disassociation) and cuts the wireless link with the base station (S116).

Figure 10:
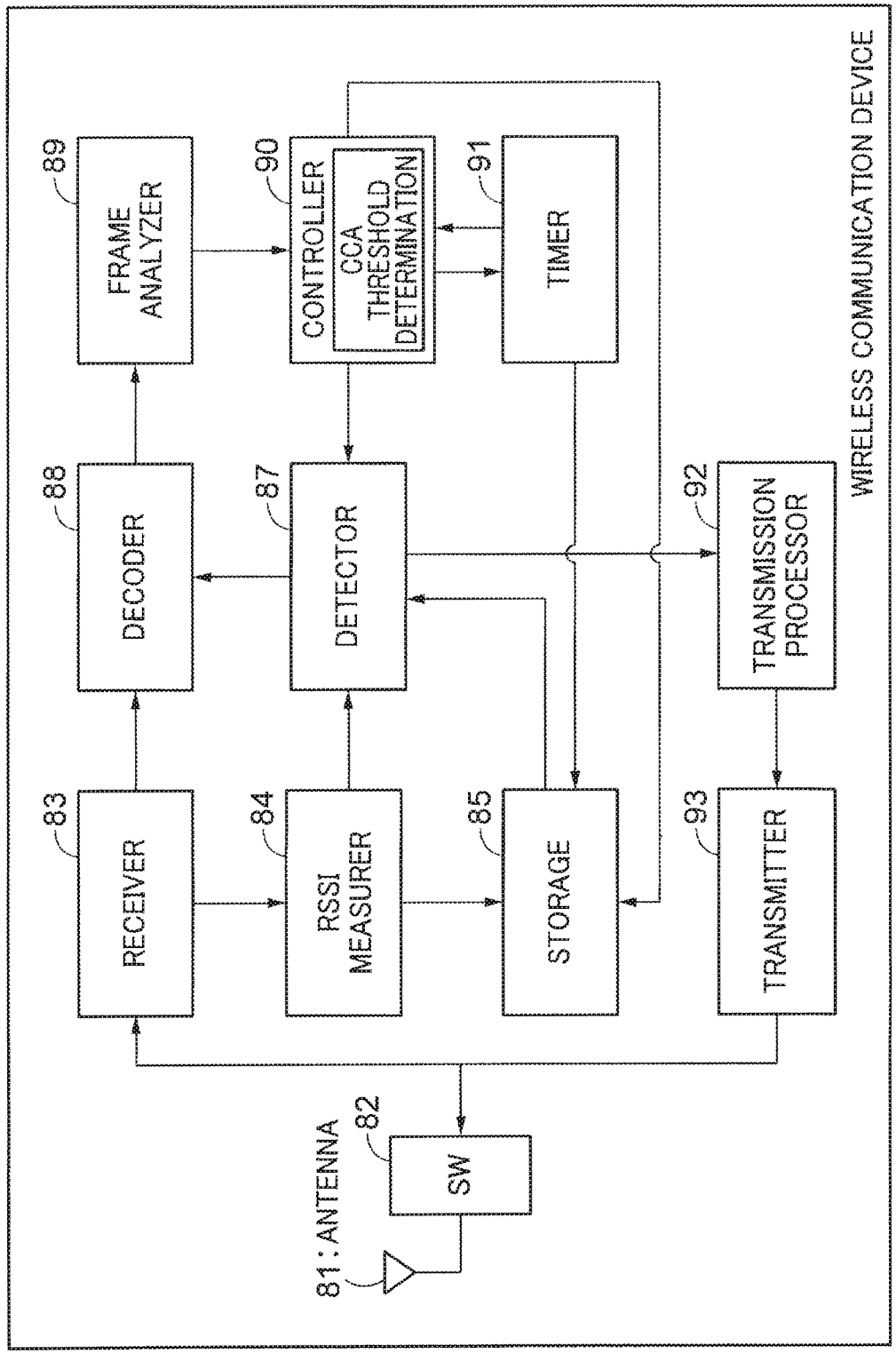
FIG. 10 is a functional block diagram of a wireless communication device mounted on a base station.

FIG. 10 is a functional block diagram of a wireless communication device (or a wireless device) mounted on a base station according to the present embodiment. The base station also has the function of determining the CCA threshold as in the terminal shown in FIG. 8. The description of the same content as in the description of the terminal shown in FIG. 8 will be appropriately omitted.

The wireless communication device of the base station includes one or a plurality of antennas 81, a transmission/reception change-over switch 82, a receiver 83, an RSSI measurer 84, a storage 85, a detector 87, a decoder 88, a frame analyzer 89, a controller 90, a timer 91, a transmission processor 92, and a transmitter 93.

The transmission/reception change-over switch 21 connects the antenna 81 to one of the receiver 83 and the transmitter 93 based on an instruction of the controller 90. At the reception, the antenna 81 is connected to the receiver 83, and a signal received through the antenna is input to the receiver 83. At the transmission, the antenna is connected to the transmitter 93, and a signal output from the transmitter 93 is transmitted through the antenna 81.

The receiver 83 converts the signal received from the antenna 81 from a radio frequency to a baseband and extracts a signal of a corresponding channel from the baseband signal through an analog filtering process. A signal of which channel is to be extracted is instructed by the controller 90. The receiver 83 applies a process, such as AD conversion, to the extracted signal to acquire a digital baseband signal. Note that the filtering process may be performed by digital processing after the acquisition of the digital baseband signal.

The RSSI measurer 84 measures received power (RSSI) as a reception level of the digital baseband signal and outputs a measured value to the detector 87. The detector 87 compares the CCA threshold read from an area (CCA threshold storage area) where the CCA threshold is stored in the storage 85 and the measured value to detect whether the wireless medium (CCA) is busy or idle and outputs carrier sense information indicating busy/idle to the decoder 88. When the carrier sense information indicates that the wireless medium is busy, the decoder 88 performs reception judgment of frame to judge whether a frame (more specifically, physical packet) is detected. When the frame is detected, the decoder 88 processes the header (physical header) of the physical packet. The RSSI measurer 84 writes, in the storage 85, the measured RSSI when the frame is detected, as a value indicating the reception level of the frame. Note that the RSSI of the frame can be calculated as in the terminal of FIG. 8. The decoder 88 decodes the data field of the physical packet according to the code modulation scheme included in the physical header and acquires the frame (MAC frame). The decoder 88 sends the acquired frame to the frame analyzer 89.

The frame analyzer 89 analyzes the frame input from the decoder 88. For example, the frame analyzer 89 performs an error check (such as CRC check) based on the value of the FCS field of the frame. When an error is detected, the frame analyzer 89 determines that the frame is not normally received and discards the frame.

When an error is not detected, the frame analyzer 89 determines that the frame is normally received and analyzes the MAC header. Specific examples of the analysis are the same as in the terminal of FIG. 8. The frame analyzer 89 sends the information obtained by the frame analysis and the information stored in the body field of the frame to the controller 90.

The controller 90 controls the communication and controls the operation in the device based on one or both of the information input from the frame analyzer 89 and an instruction from an upper layer not shown. The controller 90 may be configured by processing circuitry or controlling circuitry such as a processor.

The transmission processor 92 executes a transmission process including generation of a frame instructed from the controller 90 (more specifically, generation of a physical packet including the frame) and control of transmission of the frame (more specifically, the physical packet). The transmission processor 92 generates the frame according to the instruction of the controller 90, acquires the right to access the wireless medium according to the CSMA/CA based on the carrier sense information regarding busy/idle of the channel output from the detector 87, and outputs the frame. The right to access may be acquired through transmission of the RTS frame and reception of the CTS frame. In this case, the transmission processor 92 also has to acquire the right to access the wireless medium according to the CSMA/CA based on the carrier sense information in order to transmit the RTS frame. In the NAV period, the transmission processor 92 controls and suppresses the transmission.

The transmitter 93 applies coding, modulation, DA (Digital-Analog) conversion, gain control, band limiting according to the used channel, frequency conversion, and the like to the frame (more specifically, physical packet) input from the transmission processor 92 to form an analog signal. The transmitter 93 amplifies the analog signal and transmits a radio signal to the space from the antenna 81.

The controller 90 manages the information regarding the channel processed by the transmitter 93 and the receiver 83. The controller 90 provides the transmitter 93 and the receiver 83 with an instruction for the channel to be processed, and the receiver 83 and the transmitter 93 perform internal setting of the filter and the like as necessary according to the instructed channel and perform the operation regarding the reception and the transmission.

The controller 90 controls setting of a timer value (period) and activation of the timer 91. Once the controller 90 sets the period and activates the timer 91, the timer 91 counts time until after the set period. When the set period times out, the timer 91 outputs a time-out signal to one or both of the controller 90 and the storage 85.

The storage 85 stores various information necessary for communication, information to be transmitted to the terminal, and information received from the terminal. Information to be transmitted and received to and from a base station of another wireless communication system may also be stored in the storage 85. An example of the information necessary for communication includes the CCA threshold. The controller 90 can read and write the information to and from the storage 85. The detector 87 can read the CCA threshold stored in the storage 85. Note that a buffer for storing the CCA threshold may be separately arranged. The CCA threshold may be stored in the buffer, and the detector 87 may read the CCA threshold. The buffer may be arranged in the detector 87. The buffer may be a memory or may be an SSD (Solid State Drive), a hard disk, or the like. When the buffer is a memory, the memory may be a volatile memory, such as an SRAM and a DRAM, or a non-volatile memory, such as a NAND and an MRAM.

Although the storage 85 is provided outside of the controller 90, the buffer that stores part or all of the information stored in the storage 85 may be provided in the controller 90 or may be arranged outside of the device. One or both of the storage 85 and the buffer may be memories or may be SSDs (Solid State Drives), hard disks, or the like. When one or both of the storage 85 and the buffer are memories, the memories may be volatile memories, such as SRAMs and DRAMs, or non-volatile memories, such as NANDs and MRAMs.

In an example of operation of the controller 90, the controller 90 controls the transmission processor 92 to transmit a beacon frame every certain time. The BSSID or the MAC address of the station, information regarding the attributes of the BSS, and the like are included in the beacon frame. The controller 90 executes an association process, such as transmission of an association response frame, when an association request frame is received from the terminal. In this way, the controller 90 exchanges information necessary for the communication with the terminal. When the controller 90 decides that the received frame is a data frame addressed to the terminal based on the analysis result of the MAC header, the controller 90 outputs the data stored in the frame body field of the data frame to a higher processor not shown, as necessary. If the received frame is a management frame, the controller 90 extracts the information from the body field of the frame and manages the communication. When the received frame is a control frame, the controller 90 performs operation according to the type of the control frame. The controller also outputs, to the transmission processor 92, an instruction for generating and transmitting a frame (delivery confirmation response frame) indicating a delivery confirmation response depending on whether the received frame is a frame requiring the delivery confirmation response and depending on whether the reception of the frame is successful. Examples of the delivery confirmation response frame include an ACK frame and a BA frame.

The controller 90 executes a determination process of the threshold (CCA threshold) used for the CCA process by the detector 87. In the determination process of the CCA threshold, the controller 90 first determines a period for executing the process and executes the present process in the determined period. In this regard, the controller 90 sets the length of the determined period in the timer 91 and activates the timer 91. The controller 90 executes the present process until the timer 91 times out. Details of the present process are the same as in the terminal shown in FIG. 8, and the description will not be repeated. The example of operation shown in the flow chart of FIG. 9 can be similarly performed for the base station.

All or part of the detector 87, the decoder 88, the frame analyzer 89, the controller 90, and the transmission processor 92 correspond to the communication processing device, the wireless communication integrated circuit, or the baseband integrated circuit of the present embodiment. All or part of the processes of the digital areas of these components or the process of the communication processing device may be executed by software (program) operated on a processor, such as a CPU, may be executed by hardware, or may be executed by both of the software and the hardware. The terminal may include a processor that executes all or part of the processes of the components or the process of the communication processing device.

Figure 11:
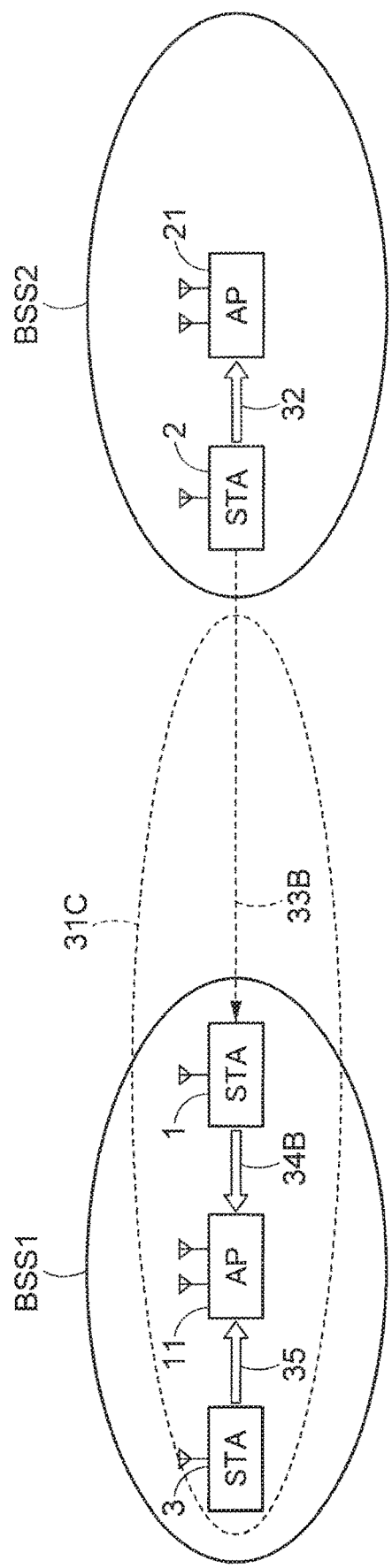
FIG. 11 is a diagram describing an effect of the first embodiment.

FIG. 11 is a diagram describing an effect of the present embodiment. Through the CCA threshold determination process, the terminal 1 increases the CCA threshold as much as possible while preventing another terminal existing in the same BSS1 from being removed from the signal detection range of the terminal 1. As a result of updating the CCA threshold in this way, the terminal 3 as a hidden terminal not included in the signal detection range in the situation of FIG. 3 also belongs to a signal detection range 31C of the terminal 1, and the terminal 3 is not a hidden terminal. On the other hand, the signal detection range 31C does not include the terminal 2 in the BSS2. As a result, the throughput can be improved by not detecting transmission from another network (BSS2), and a reduction in the throughput caused by the existence of a hidden terminal can also be suppressed. Therefore, the throughput can be improved as a whole.

According to the present embodiment, the CCA threshold is determined based on the minimum RSSI value of the frame received from the terminal belonging to the same BSS as the BSS that the terminal (including a case of a base station) belongs. In this way, generation of a hidden terminal in the BSS can be suppressed, and detection of an unnecessary carrier from another BSS in the terminal can be suppressed. Therefore, transmission opportunities of the terminal increase, and the throughput of the system can be improved.

Second Embodiment

Although the method of determining the length of the period for executing the CCA threshold determination process is not particularly limited in the first embodiment, an example of the method of determining the length of the period for executing the CCA threshold determination process will be specifically illustrated in the present embodiment. The block diagrams of the terminal and the base station are the same as FIGS. 8 and 10 of the first embodiment.

Figure 12:
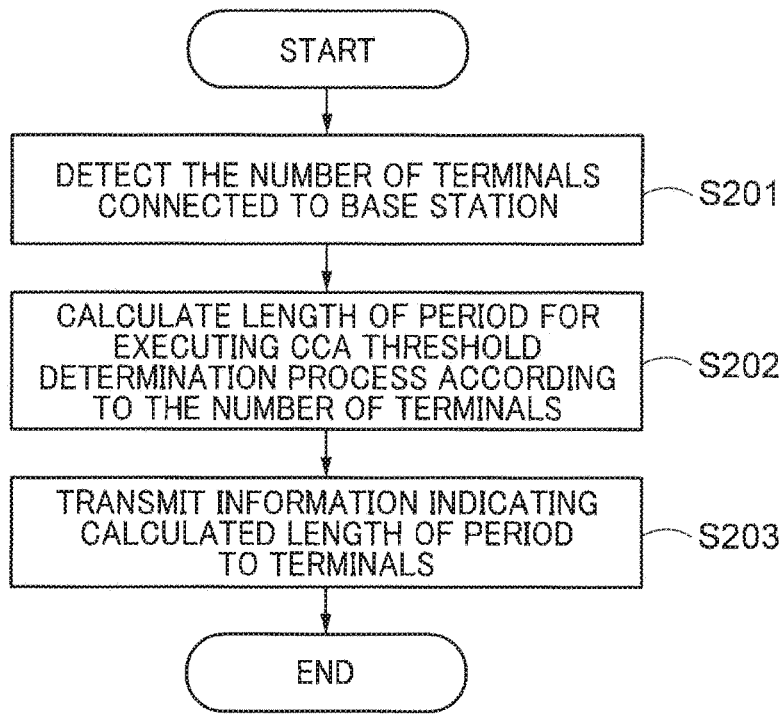
FIG. 12 is a diagram showing a flow chart of an example of operation of a base station according to a second embodiment.

The controller 90 of the base station according to the present embodiment determines the length of the period for executing the CCA threshold determination process according to the number of terminals connected to (associated with) the base station. FIG. 12 shows a flow chart of operation in this case. The controller 90 of the base station detects the number of terminals connected to the base station, that is, the number of terminals belonging to the same BSS or wireless network as the base station (S201). The controller 90 determines the length of the period for executing the CCA threshold determination process according to the number of terminals (S202). The controller 90 stores the determined value in the storage 85 or a buffer inside or outside of the controller 90. The controller 90 uses the determined length for the length of the period for executing the CCA threshold determination process. The controller 90 instructs the transmission processor 92 to generate and transmit a frame including information indicating the determined length of the period, and the transmission processor 92 generates the frame and transmits the frame to each terminal in the BSS (S203). For example, a beacon frame may be used for the frame, or another management frame may be transmitted. As described, when the management frame is transmitted, the information element including the information is set in the frame body field. The terminal determines the length of the period (for example, set value of timer) for executing the CCA threshold determination process according to the information included in the frame received from the base station. In this way, the length of the period for executing the CCA threshold determination process is determined according to the number of terminals. Therefore, opportunities for receiving frames from as many terminals as possible are secured, and the CCA threshold determination process can be completed early.

In the calculation of the length of the period, a longer length of period is set for a larger number of terminals, for example.

In this way, opportunities for receiving frames from as many terminals as possible can be increased. One or both of an upper limit and a lower limit may be set for the length of the period. A table associating the number of terminals and the length of the period may be stored in the storage 85 or another storage, and the length of the period may be determined from the calculated number of terminals according to the table. Alternatively, a table associating the range of the number of terminals and the length of the period may be used. In this case, the length of the period corresponding to the range that the calculated number of terminals belong can be determined. A function with the number of terminals as an input and the length of the period as an output may also be used. In this case, the function can be calculated based on the calculated number of terminals to obtain the length of the period.

Figure 13:
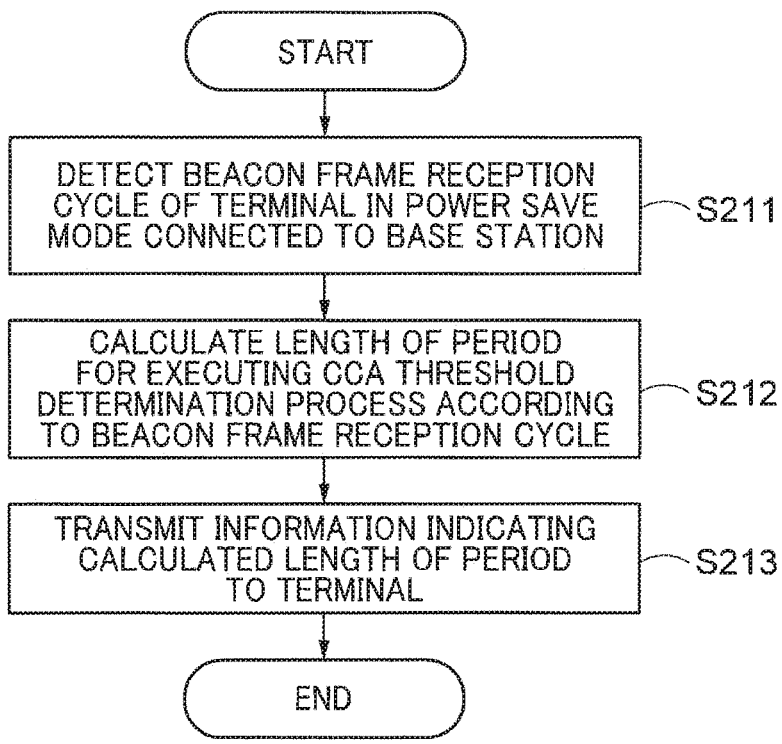
FIG. 13 is a diagram showing a flow chart of another example of operation of the base station according to the second embodiment.

Methods other than the method of using the number of terminals connected to the base station to calculate the length of the period are also possible. For example, a terminal shifted to the power save mode can also calculate the length of the period according to a cycle of receiving the beacon frame transmitted every certain time by the base station. FIG. 13 shows a flow chart of operation of the base station in this case.

The controller 90 of the base station receives a notification of a reception cycle (for example, Listen Interval) of the beacon frame from the terminal to be shifted to the power save mode (S211). As a result, the controller 90 of the base station can detect the reception cycle of the terminal to be shifted to the power save mode. Although a terminal not in the power save mode can basically receive the beacon frame transmitted from the base station every time, the case is not limited to this. The controller 90 of the base station determines a value greater than the cycle of the terminal with the longest cycle of receiving the beacon frame as the length of the period for executing the CCA threshold determination process (S212). For example, a certain value can be added to the cycle to obtain the value, or the cycle can be multiplied by a certain value to obtain the value. Alternatively, one cycle length can be added to the cycle to obtain the value, or a value greater than the cycle and equal to or smaller than an upper limit can be determined as the value.

The example of the reception cycle of the beacon frame of the terminal to be shifted to the power save mode is described here. However, the target terminal is not limited to the terminal of the power save mode as long as the base station transmits the frame at a certain time, and the terminal can adjust the reception cycle of the frame. The target frame is not limited to the beacon frame.

The controller 90 instructs the transmission processor 92 to generate and transmit a frame including the information indicating the determined length of the period, and the transmission processor 92 generates and transmits the frame (S213). The terminal determines the length of the period (for example, set value of timer) for executing the CCA threshold determination process according to the information included in the frame received from the base station. When the base station executes the CCA threshold determination process, the base station also executes the CCA threshold determination process based on the length of the period determined in step S212.

When the terminal shifted to the power save mode confirms that the base station holds data addressed to the terminal at the reception of the beacon frame, the terminal can transmit a frame (PS-Poll frame in IEEE 802.11 standard) for requesting transmission of the data to the base station. In this case, the frame transmitted by the terminal can be received, and the RSSI of the frame can also be measured. Therefore, the process of the flow chart of FIG. 13 can be executed to secure the opportunities for receiving the frames from the terminals shifted to the power save mode, regardless of the beacon frame reception cycle.

Figure 14:
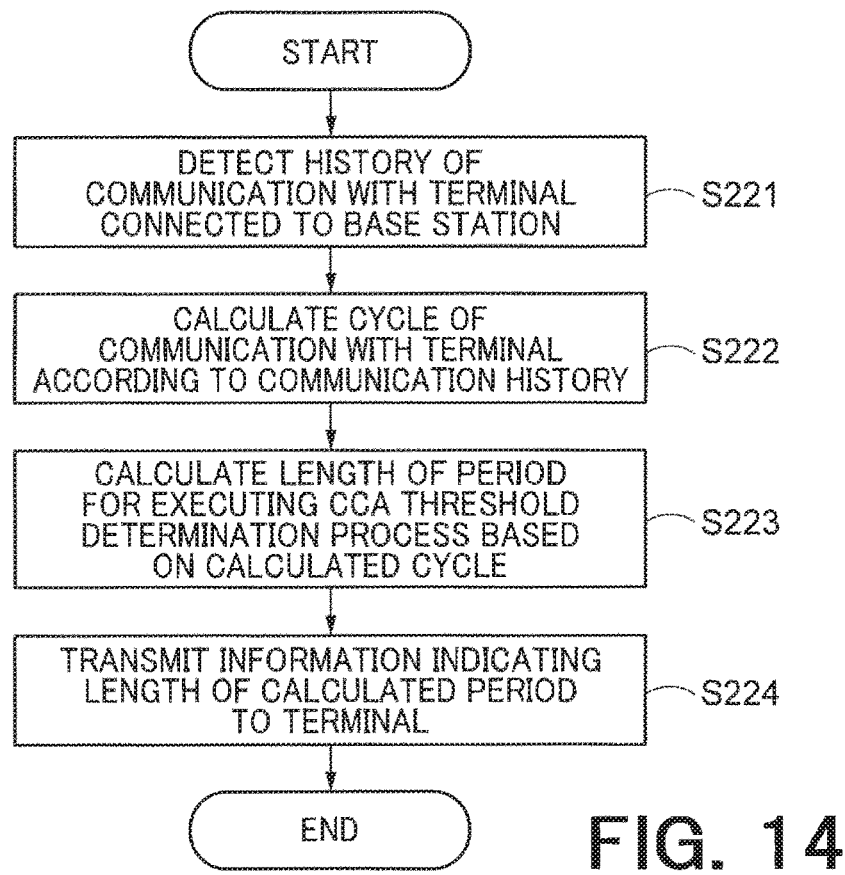
FIG. 14 is a diagram showing a flow chart of yet another example of operation of the base station according to the second embodiment.

The base station may also determine the length of the period based on the history of communication with each terminal. FIG. 14 shows a flow chart of operation in this case. For example, the controller 90 of the base station records the history of communication with the terminals in the storage 85 or another storage for a certain period or an arbitrary period (S221). The controller 90 calculates the cycle of communication of each terminal based on the communication history (S222).

An example of the cycle of communication includes a cycle of starting the frame exchange. Specifically, when the RTS frame, the CTS frame, the data frame, and the delivery confirmation response frame are exchanged, the RTS frame is equivalent to the start of the frame exchange. When only the data frame and the delivery confirmation response frame are exchanged, the data frame is equivalent to the start of the frame exchange. The start time of the frame exchange is detected to calculate one or more intervals of the start time.

An average value, a median, a minimum value, a maximum value or the like of the calculated intervals may be the cycle of communication. The definition of the cycle of communication and the calculation method of the cycle illustrated here are just an example, and other definitions and methods may be adopted.

The controller 90 of the base station determines a value greater than the cycle of the terminal with the longest cycle of communication as the length of the period for executing the CCA threshold determination process (S223). For example, a certain value may be added to the cycle to obtain the value, or the cycle may be multiplied by a certain value to obtain the value. Alternatively, one cycle length may be added to the cycle to obtain the value, or a value greater than the cycle and equal to or smaller than an upper limit can be determined as the value. The controller 90 instructs the transmission processor 92 to generate and transmit a frame including information indicating the determined length of the period, and the transmission processor 92 generates and transmits the frame (S224). When the terminal executes the CCA threshold determination process, the terminal determines the length of the period (for example, set value of timer) for executing the CCA threshold determination process according to the information included in the frame received from the base station. When the base station executes the CCA threshold determination process, the base station also executes the CCA threshold determination process based on the length of the period determined in step S222. The length of the period is determined in this way, and the terminal and the base station can secure the opportunities of receiving frames from terminals with low frequency of communication and measure the RSSI According to the present embodiment, the length of the period for executing the CCA threshold determination process is determined according to the number of terminals, the situation of communication, and the like, and opportunities for receiving the frames from as many terminals as possible are secured. Therefore, the CCA threshold can be appropriately determined, and as a result, a reduction in the throughput can be suppressed.

Third Embodiment

In the first and second embodiments, the CCA threshold determination process is executed at a preset point or a designated point, such as at the activation, every certain time, or at the point of user instruction. In the present embodiment, the CCA threshold determination process is dynamically executed according to the number of terminals connected to the base station, the situation of communication, or the like.

Figure 15:
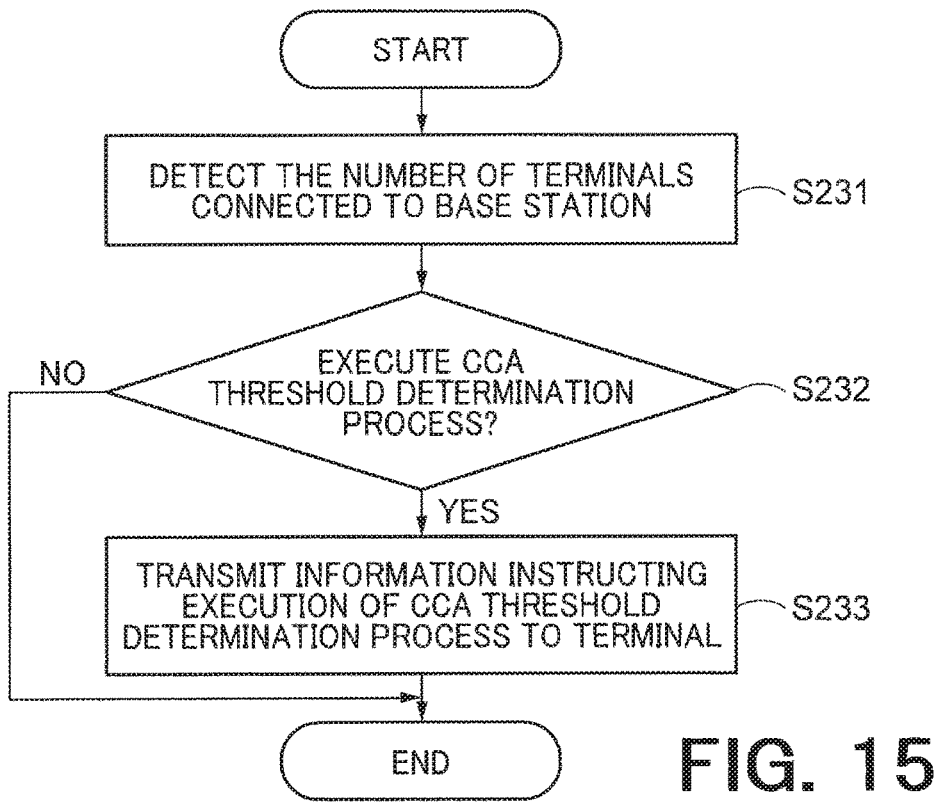
FIG. 15 is a diagram showing a flow chart of another example of operation of a base station according to a third embodiment.

The controller 90 of the base station may determine to start the CCA threshold determination process according to the number of or a change in the number of terminals connected to (completed with the association process with) the base station. FIG. 15 shows an operation flow of the base station in this case. The controller 90 of the base station manages the number of terminals belonging to the same BSS or wireless network as the base station (S231). For example, the controller 90 increases the number by one when there is a newly connected terminal, and the controller 90 decreases the number by one when there is a disconnected terminal.

The controller 90 decides whether to execute the CCA threshold determination process according to one or both of the number of terminals and a change in the number of terminals (S232). For example, the controller 90 determines to execute the CCA threshold determination process when the number of terminals becomes a preset value. The number of preset values can be one or two or more. The controller 90 may determine to start the CCA threshold determination process every time the number of terminals increases by X. The controller 90 may determine to start the CCA threshold determination process every time the number of terminals decreases by Y. One or both of the values of X and Y may be certain values or may change according to the number of terminals. For example, the value of X may increase or decrease with an increase in the number of terminals. The value of Y may decrease or increase with a decrease in the number of terminals. When the value of X is 1, the execution of the CCA threshold determination process is determined every time there is a terminal associated with the base station. When the execution of the CCA threshold determination process is determined, the controller 90 of the base station transmits frames including information for instructing the execution of the CCA threshold determination process to the terminals connected to the base station through the transmission processor 92 (S233). The controller 60 of the terminal starts the CCA threshold determination process according to the instruction in the frame. When the execution of the CCA threshold determination process is determined, the base station may also start the CCA threshold determination process in the base station. The frame for transmitting the information instructing the execution of the CCA threshold determination process may be a beacon frame or a separately defined management frame, or a control frame or a data frame can be used. For example, one of a plurality of frames included in the payload of the A-MPDU may be a data frame or a control frame, and the information indicating the instruction may be included in the data frame or the control frame.

Figure 16:
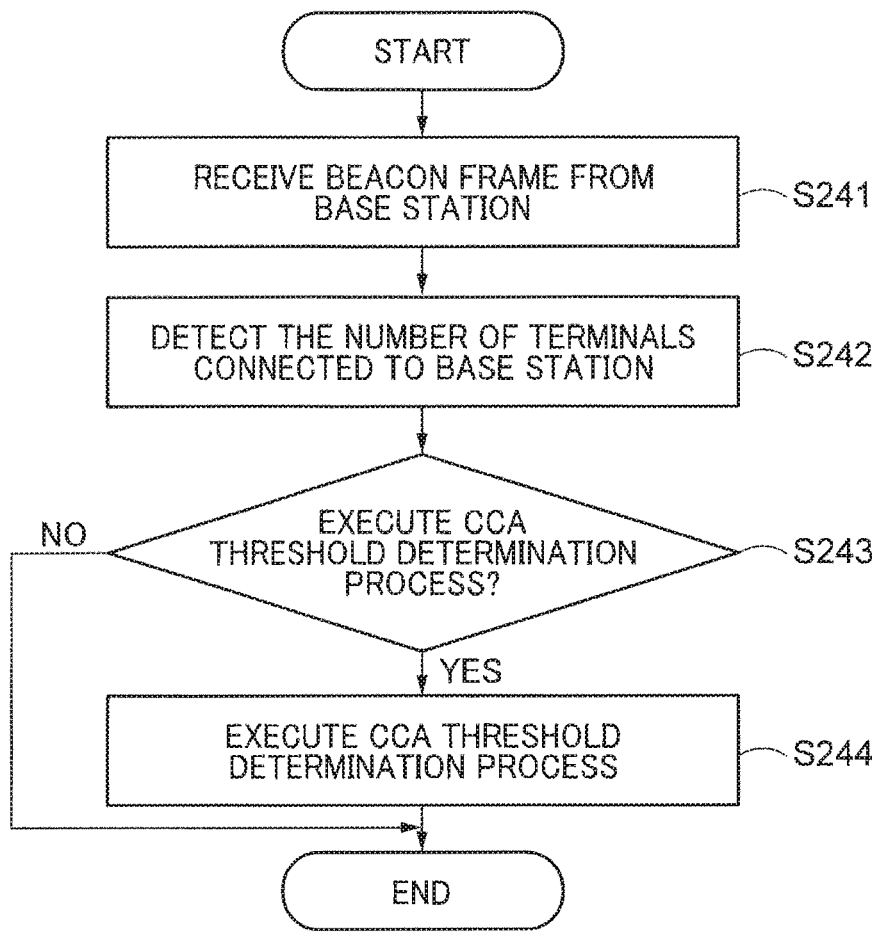
FIG. 16 is a diagram showing a flow chart of an example of operation of a terminal according to the third embodiment.

Whether to execute the CCA threshold determination process may be decided not only by the base station, but also by individual terminals. FIG. 16 shows an operation flow of the terminal in this case. The terminal receives the beacon frame transmitted from the base station (S241). Information indicating the number of connected terminals is set in the beacon frame transmitted from the base station (for example, the number of terminals is set in a Station Count field of BSS Load Element). The terminal detects the number of terminals connected to the base station based on the received beacon frame (S242) and decides whether to execute the CCA threshold determination process in the same way as the decision by the base station (S243). When the terminal determines to execute the CCA threshold determination process, the terminal starts the CCA threshold determination process (S244).

Other than the number of terminals or the change in the number of terminals connected to the base station, whether to execute the CCA threshold determination process can be decided according to the situation of communication in the BSS. For the situation of communication, the base station may measure the frequency of reception error in the frame, for example. When the frequency of error exceeds a certain value, the base station may decide that there is a possibility that the number of hidden terminals has increased, and the base station may determine to execute the CCA threshold determination process. An example of calculating the frequency of reception error includes "the number of frames failed to receive"/"the number of successfully received frames", wherein "/" indicates division. Methods other than the method described here may be used to calculate the frequency of reception error. Specific examples of the reception error include an error in the inspection result of the FCS and error detection in the physical layer.

Other than the methods based on the number of terminals, the change in the number of terminals, and the situation of communication, an example of determining whether to execute the CCA threshold determination process includes a method in which one or both of the base station and the terminal use arbitrary criteria to determine whether to execute the CCA threshold determination process. For example, the execution of the CCA threshold determination process may be determined every time a terminal newly associated with the base station is detected. In this case, the base station transmits frames including the information for instructing the execution of the CCA threshold determination process to the terminals connected to the base station.

According to the present embodiment, the CCA threshold determination process is dynamically executed when the number of terminals, the situation of communication, or the like is changed, and a reduction in the throughput can be suppressed regardless of the change in the environment.

Fourth Embodiment

In the present embodiment, the base station selectively applies a default CCA threshold (called "CCA threshold 1" here) and a CCA threshold calculated in the CCA threshold determination process (called "CCA threshold 2" here) in each interval of the beacon frame (beacon interval). The CCA threshold 1 is lower than the CCA threshold 2 (signal detection range is wider). Information indicating which one of the CCA thresholds will be applied in each beacon is transmitted to the terminal. When the terminal executes the association process with the base station, the terminal transmits association request frames in beacon intervals in which the default CCA threshold 1 is applied. In this way, even if a new terminal enters the coverage area of the base station, and the terminal is not in the signal detection range corresponding to the CCA threshold 2, the terminal can normally execute the association process with the base station. The present embodiment will be described in detail.

The controller 90 of the base station executes the CCA threshold determination process as in the first to third embodiments to calculate the CCA threshold (CCA threshold 2). The controller 90 selectively applies one of the default CCA threshold (CCA threshold 1) and the CCA threshold 2 calculated in the CCA threshold determination process in each beacon interval. For example, the controller 90 may apply the CCA threshold 1 in beacon intervals at a predetermined cycle and apply the CCA threshold 2 in the other beacon intervals. The controller 90 may randomly determine or use an arbitrary method to determine the CCA threshold to be applied in each beacon interval. The frequency of applying the CCA threshold 1 may be changed according to the situation of communication. For example, when there are a large number of terminals connected to the base station, and the number of terminals to be newly connected needs to be suppressed, the frequency of applying the CCA threshold 1 may be reduced to make the connection of a new terminal difficult.

The controller 90 controls at least one of the detector 87 and the storage 85 to apply the corresponding CCA thresholds in the beacon intervals.

The controller 90 also transmits, to each terminal, information designating which one of the CCA thresholds will be applied in each beacon interval. For example, the controller 90 may transmit information designating the CCA threshold to be used in the beacon interval of this time, in the beacon frame at the start of each beacon interval. The controller 90 may collectively notify, for a plurality of beacon intervals, information designating the CCA thresholds to be used in the plurality of beacon intervals. The controller 90 may use methods other than the methods described here to notify the information. The content of the notified information may be values of the CCA thresholds or may be values for identifying one of the thresholds. When the controller 90 notifies the values of the CCA thresholds, the terminal is already detecting the default CCA threshold of the base station due to a reason that the CCA threshold is set in advance in the system or standard. Therefore, the terminal can decide which one of the CCA values (that is, a CCA threshold with a higher value and a CCA threshold with a lower value) is notified when the value of the CCA threshold 2 is transmitted. When the controller 90 notifies the values for identifying one of the CCA thresholds, a bit "1" may indicate the CCA threshold 1, and a bit "0" may indicate the CCA threshold 2, and vice versa. The information may be set as an information element in the body field of the beacon frame. A free area of an existing field may be used for the information, or a new field may be added.

Based on the information transmitted from the base station, the controller 60 of the terminal detects which one of the CCA threshold 1 and the CCA threshold 2 will be applied in each beacon interval. When the terminal tries to connect to the base station, the terminal waits for the arrival of the beacon interval in which the threshold 1 is applied. At the arrival of the beacon interval, the terminal transmits an association request frame in the beacon interval. In this way, the base station can surely receive the association request frame transmitted by the terminal, and the terminal can connect to the base station. Although the association request frame is described as an example here, the terminal may withhold the transmission of the frame until the arrival of the beacon interval in which the CCA threshold 1 is applied, if the frame needs to be surely received by the base station. Note that the type of the frame that can be transmitted may be limited in the beacon interval in which the CCA threshold 1 is applied. For example, only the frames related to the association process may be able to be transmitted. In this way, the possibility of succeeding in the association process with the base station can be increased even in a congested situation where a large number of terminals exist in the BSS.

Figure 17:
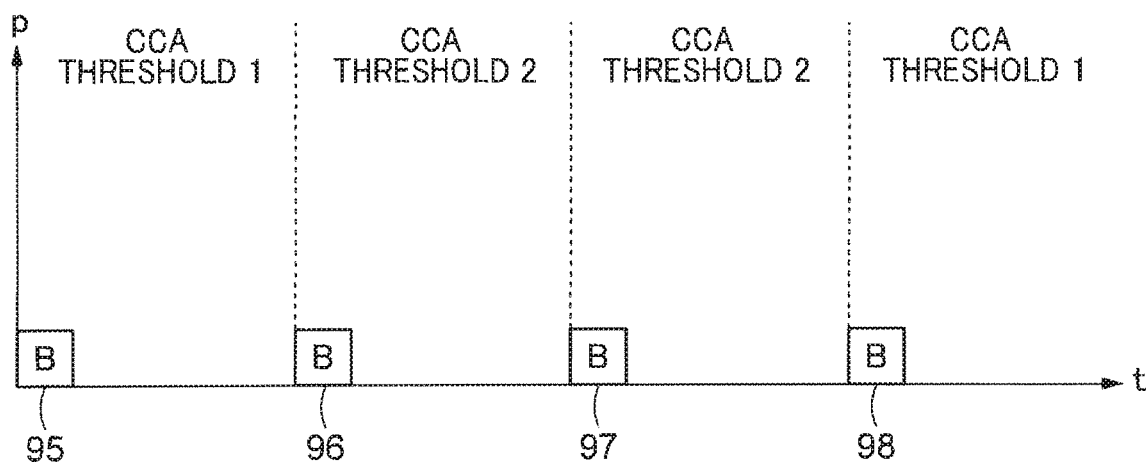
FIG. 17 is a diagram showing an example of selectively applying one of two CCA thresholds in each beacon interval.

FIG. 17 shows an example in which the CCA threshold 1 and the CCA threshold 2 are selectively applied in each beacon interval. The horizontal axis indicates time, and the vertical axis indicates power. The beacon frame is transmitted from the base station every certain time. Rectangles with a letter "B" indicate beacon frames. The beacon frame is provided with the information indicating which one of the CCA threshold 1 and the CCA threshold 2 will be applied, in the beacon interval starting from the beacon frame. In the illustrated example, information designating the CCA threshold 1 is set in a beacon frame 95, and information designating the CCA threshold 2 is set in a beacon frame 96. Information designating the CCA threshold 2 is set in a beacon frame 97, and information designating the threshold 1 is set in a beacon frame 98. When the terminal connects to the base station, the terminal transmits association request frames in the beacon intervals in which the CCA threshold 1 is applied. When the terminal transmits authentication request frames after receiving an association response frame from the base station, the terminal can also transmit the authentication request frames in the same beacon intervals as the association request frames. When the transmission in the beacon interval cannot be performed in time, the terminal may wait for the next arrival of the beacon interval in which the CCA threshold 1 is applied.

Figure 18:
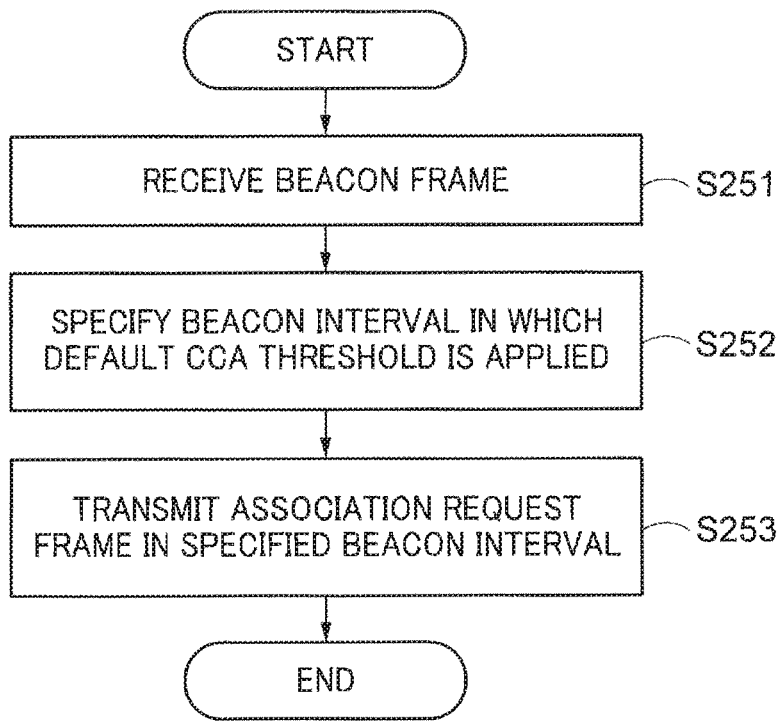
FIG. 18 is a diagram showing a flow chart of an example of operation of a terminal according to a fourth embodiment.

FIG. 18 shows a flow chart of an example of operation of the terminal according to the present embodiment. In the example of operation illustrated here, the terminal enters the coverage area of the base station and newly connects to the base station. The terminal receives a beacon frame transmitted from the base station (S251). The terminal analyzes the beacon frame to specify the beacon intervals in which the default CCA threshold (CCA threshold 1) is applied (S252). The terminal waits for the arrival of the specified beacon interval and transmits the association request frame in the beacon interval (S253).

According to the present embodiment, the beacon intervals in which the default CCA threshold (CCA threshold 1) is applied are provided even after the CCA threshold determination process. Therefore, even when a newly entered terminal is not positioned in the signal detection range corresponding to the CCA threshold (CCA threshold 2) determined in the CCA threshold determination process, the terminal can be surely connected to the base station. When the newly entered terminal is outside of the signal detection range of the CCA threshold 2, the terminal may not be able to communicate with the base station in the beacon intervals in which the CCA threshold 2 is applied, even after the terminal is connected to the base station. However, the base station executes the CCA threshold determination process again after the connection with the terminal, and the CCA threshold is calculated again such that the signal detection range includes the terminal. In this way, the terminal can also communicate with the base station in the beacon intervals not provided with the CCA threshold 1.

Fifth Embodiment

Although the type of the frame for measuring the RSSI is not particularly limited in the first to fourth embodiments, the type of the frame for measuring the RSSI is specified in the present embodiment. Data transmission may be performed by a directional radio wave (beam) through beam forming or MIMO (Multiple Input, Multiple Output: MU-MIMO) depending on the wireless communication system. For example, the MIMO technology is adopted in IEEE 802.11n, and the beam forming is adopted as an option. The beam forming is a standard in IEEE 802.11ac. When a signal of the directional radio wave is received, there is a possibility of receiving a higher strength signal, compared to the transmission by an omni-directional radio wave (omni-transmission). Meanwhile, even in the terminal using the beam forming or the MIMO, the RTS frame and the CTS frame are usually subjected to omni-transmission in order to set the NAV in surrounding terminals. The delivery confirmation response frame (such as ACK frame and BA frame) is usually subjected to the omni-transmission, because the frame length is short, and the transmission rate is low.

Therefore, only the RSSI of the frame subjected to the omni-transmission is used to determine the CCA threshold in the present embodiment. For example, part or all of the RTS frame, the CTS frame, and the delivery confirmation response frame are the target. Even when a frame other than these is received, the RSSI of the frame is not used to determine the CCA threshold. When a frame subjected to the beam transmission is received, and the frame can be decoded, there is a possibility that the CCA threshold is set to a significantly high value if the CCA threshold is determined based only on the frame. However, the problem can be prevented by measuring the frames not subjected to the beam transmission, and an appropriate CCA threshold can be set.

Figure 19:
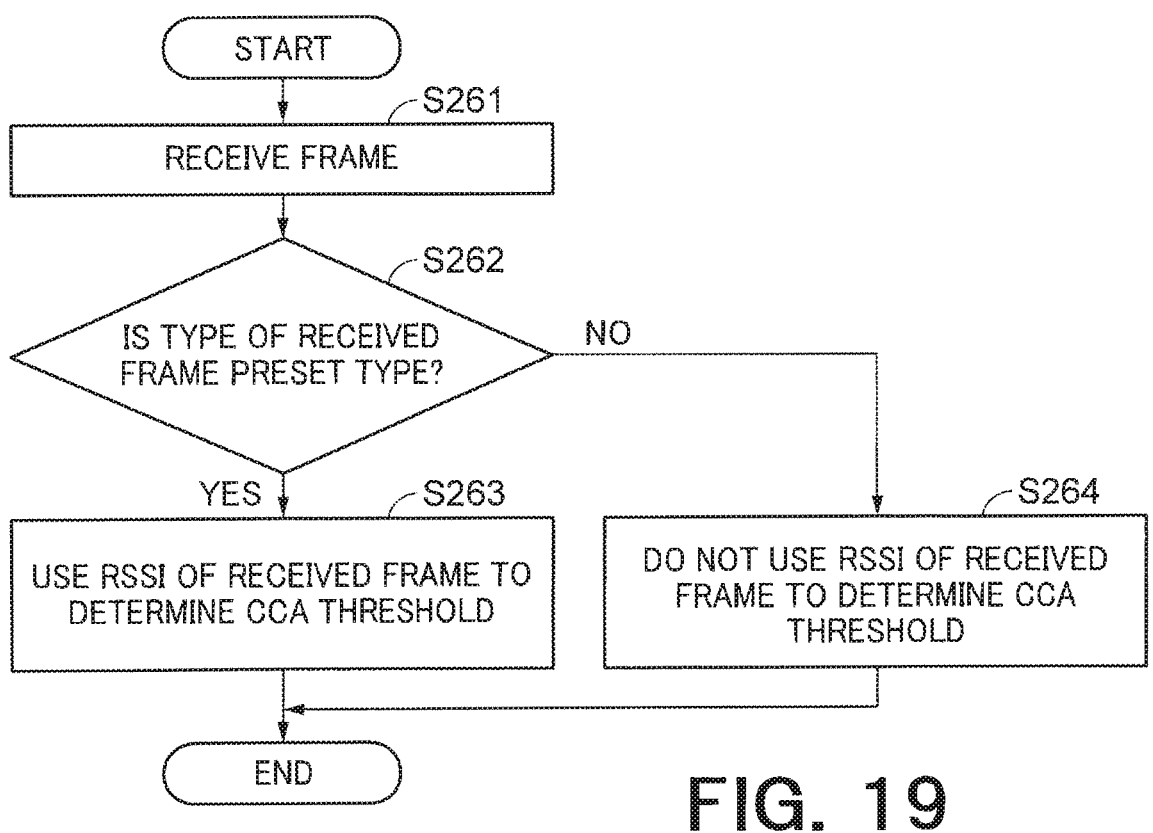
FIG. 19 is a diagram showing a flow chart of an example of operation of the terminal or a base station according to the fourth embodiment.

FIG. 19 shows a flow chart of an example of operation of the terminal or the base station according to the present embodiment. When the terminal or the base station receives a frame (S261), the terminal or the base station judges the type of the frame (S262). If the type of the frame is a preset type (such as RTS, CTS, ACK, and BA), the terminal or the base station uses the RSSI of the frame to determine the CCA threshold (S263). On the other hand, if the type of the frame is other than these, the terminal or the base station does not use the frame to determine the CCA threshold (S264). The present process can be executed every time a frame is received during the execution of the CCA threshold determination process shown in FIG. 9, for example. When the terminal or the base station decides to use the frame to determine the CCA threshold, the terminal or the base station can execute the process of steps S110, S111, and S112 of FIG. 9. When the terminal or the base station decides not to use the frame to determine the CCA threshold, the terminal or the base station can skip the process of steps S110, S111, and S112.

Sixth Embodiment

Figure 20:
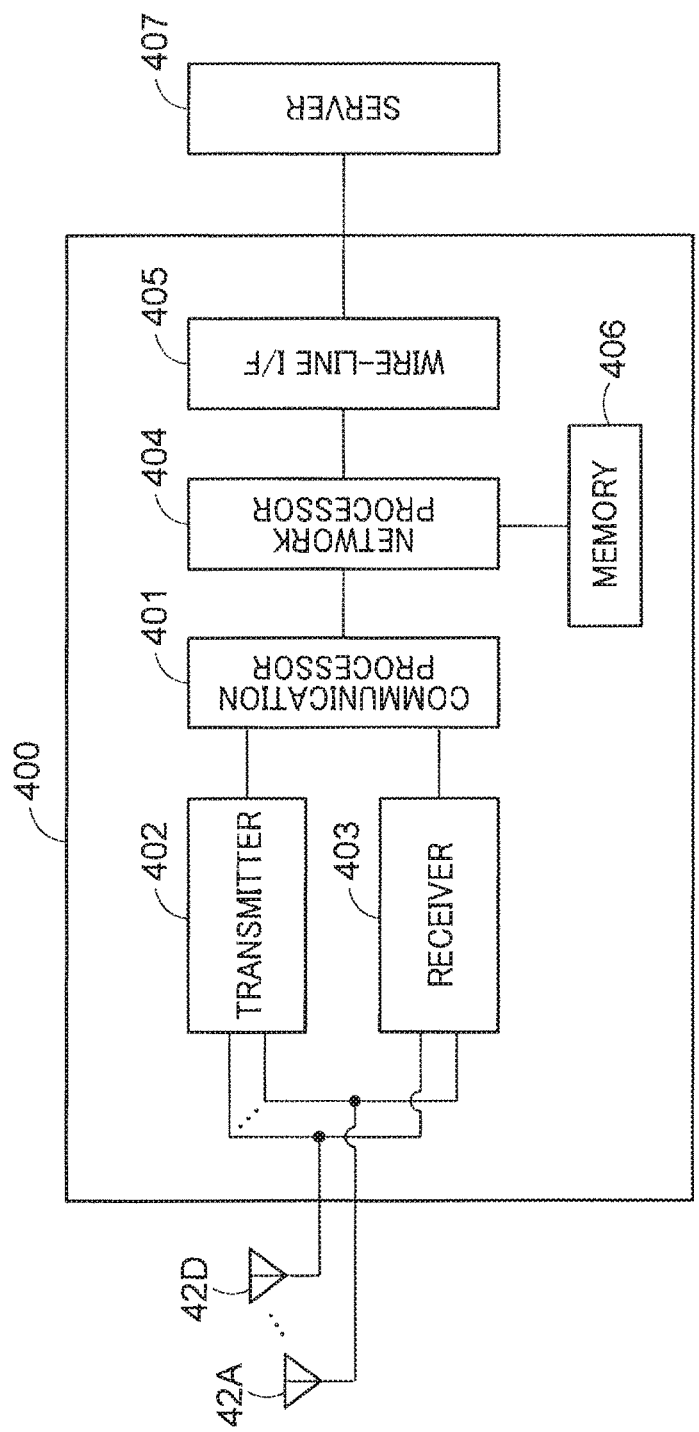
FIG. 20 is a functional block diagram of a base station or a terminal according to a sixth embodiment.

FIG. 20 is a functional block diagram of a base station (access point) 400 according to a sixth embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. The communication processor 401 has functions similar to the controller 60, the frame analyzer 59 and the transmission processor 62 described in the first embodiment. The transmitter 402 and the receiver 403 have functions similar to the transmitter 63 and the receiver 53 described in the first embodiment. The network processor 404 has functions similar to the higher processor described in the first embodiment. The communication processor 401 may internally possess a buffer for transferring data to and from the network processor 404. The buffer may be a volatile memory, such as a DRAM, or may be a non-volatile memory, such as a NAND and an MRAM.

The network processor 404 controls data exchange with the communication processor 401, data writing and reading to and from the memory 406, and communication with the server 407 through the wired I/F 405. The network processor 404 may execute an upper communication process of the MAC layer, such as TCP/IP and UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital domains of the transmitter 402 and the receiver 403 and parts that execute processing of analog domains may be formed by different chips. The communication processor 401 may execute an upper communication process of the MAC layer, such as TCP/IP and UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND and an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly. In this case, a wireless I/F may be employed instead of the wired I/F 405.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC and a smartphone.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value and an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 detects that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) of the present embodiment can be applied as the base station of the first to fifth embodiments.

In the present embodiment, although the base station with the cache function is described, a terminal (STA) with the cache function can also be realized by the same block configuration as FIG. 20. In this case, the wired I/F 405 may be omitted.

Seventh Embodiment

Figure 21:
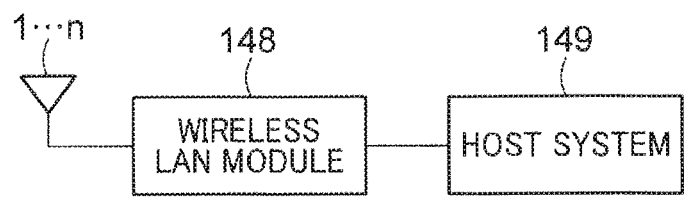
FIG. 21 is a diagram showing an example of entire configuration of a terminal or a base station according to a seventh embodiment.

FIG. 21 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external devices according to an arbitrary communication protocol. The communication protocol may include the TCP/IP and a protocol of a layer upper than that. Alternatively, the TCP/IP may be mounted on the wireless LAN module 148, and the host system 149 may execute only a protocol in a layer upper than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, and a hand-held device.

Figure 22:
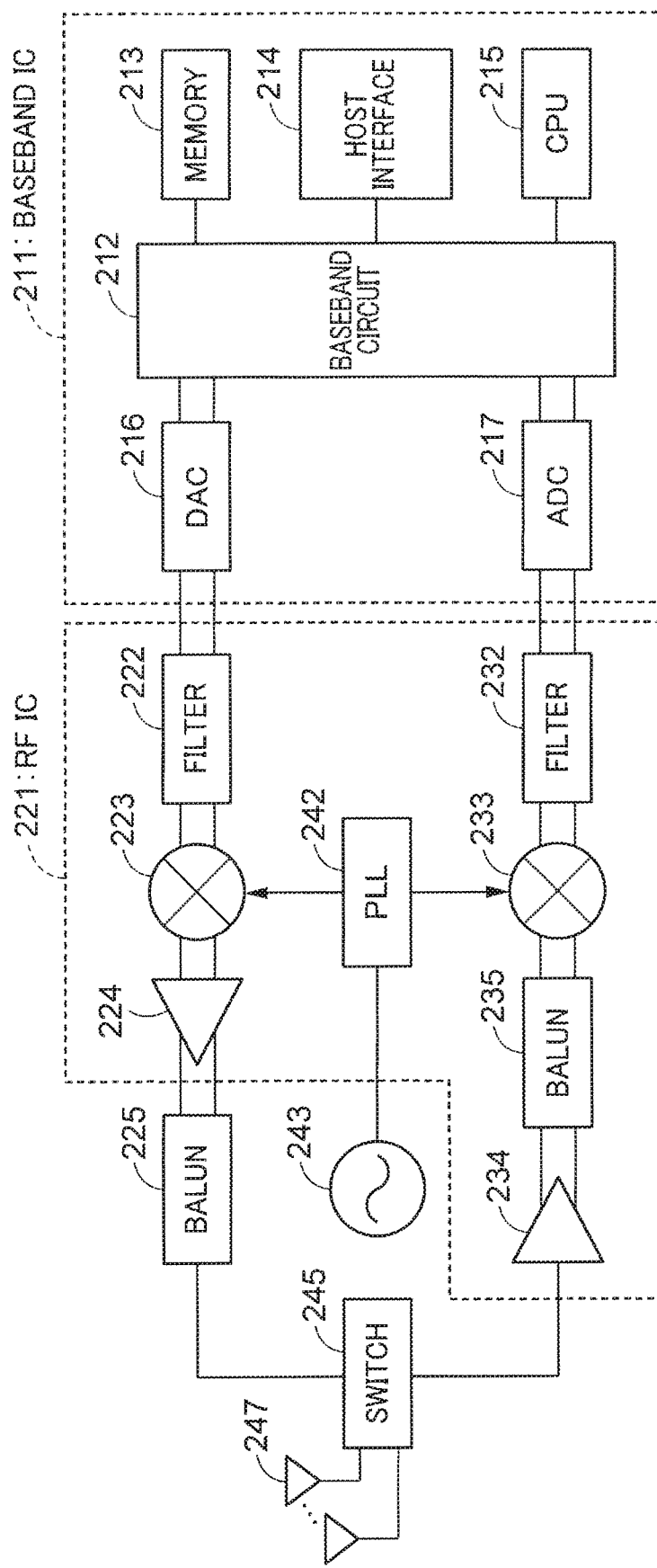
FIG. 22 shows an example of hardware configuration of a wireless LAN module mounted on the terminal or the base station according to the seventh embodiment.

FIG. 22 shows an example of hardware configuration of a wireless LAN module. The configuration can also be applied when the wireless communication device (or a wireless device) is mounted on either one of the terminal that is a non-base station and the base station. Therefore, the configuration can be applied as an example of specific configuration of the wireless communication device shown in FIG. 8 or 10. At least one antenna 247 is included in the example of configuration. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device or wireless device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM and a DRAM, or may be a non-volatile memory, such as a NAND and an MRAM.

The host interface 214 is an interface for connection to the host system. The interface can be anything, such as UART, SPI, SDIO, USB, and PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control device that controls communication or the controller that controls communication.

At least one of the baseband circuit 212 and the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

The baseband circuit 212 or the CPU 215 may execute a process regarding the MIMO. The baseband circuit 212 or the CPU 215 may execute at least one or a plurality of a process of propagation path estimation, a transmission weight calculation process, a separation process of stream, and the like. The baseband circuit 212 or the CPU 215 may control the operation of the filters 222 and 232 to extract signals covered by a used channel according to the setting of the channel. Another controller that controls the filters 222 and 232 may exist, and the baseband circuit 212 or the CPU 215 may issue an instruction to the controller to perform similar control.

Seventh Embodiment

Figure 23:
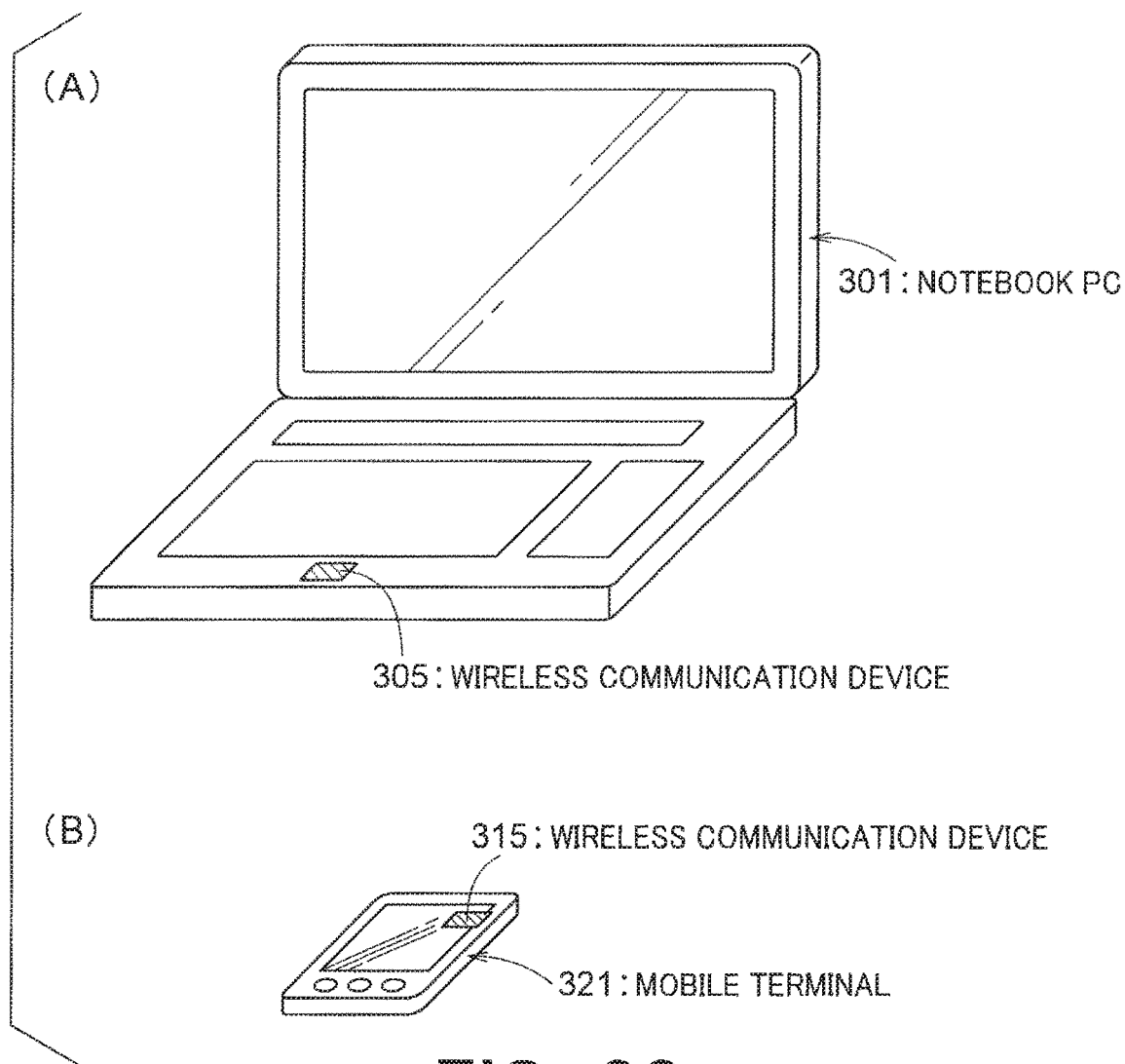
FIG. 23 is a perspective view of a wireless terminal.

FIG. 23(A) and FIG. 23(B) are perspective views of wireless terminal according to the eighth embodiment. The wireless terminal in FIG. 23(A) is a notebook PC 301 and the wireless communication device (or a wireless device) in FIG. 23(B) is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 24:
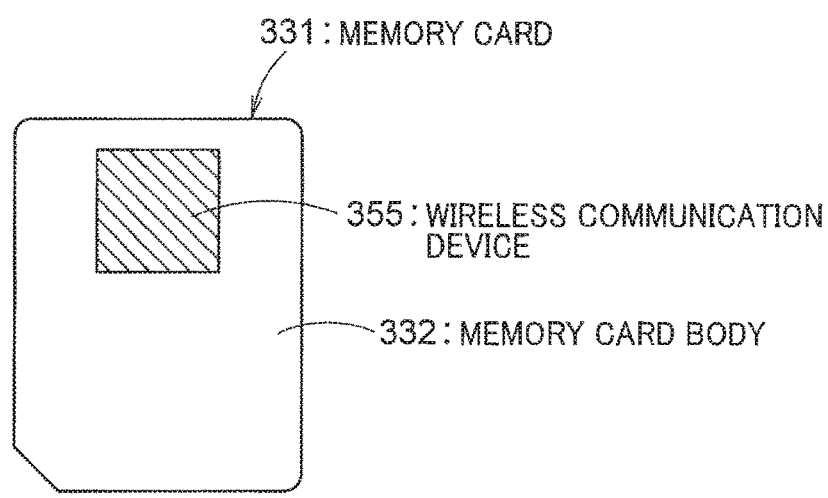
FIG. 24 is a diagram showing a memory card.

Moreover, a wireless communication device installed in a terminal (which may indicate a base station) can also be provided in a memory card. FIG. 24 illustrates an example of a wireless communication device mounted on a memory card. A memory card 331 contains a wireless communication device 355 and a body case 332. The memory card 331 uses the wireless communication device 355 for wireless communication with external devices. Here, in FIG. 24, the description of other installed elements (for example, a memory, and so on) in the memory card 331 is omitted.

Ninth Embodiment

In the ninth embodiment, a bus, a processor unit and an external interface unit are provided in addition to the configuration of the wireless communication device of the terminal (which may indicate the base station) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Tenth Embodiment

In the tenth embodiment, a clock generating unit is provided in addition to the configuration of the wireless communication device of the terminal (which may indicate the base station) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Eleventh Embodiment

In the eleventh embodiment, a power source unit, a power source controlling unit and a wireless power feeding unit are included in addition to the configuration of the wireless communication device of the terminal (which may indicate the base station) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Twelfth Embodiment

In the twelfth embodiment, a SIM card is added to the configuration of the wireless communication device according to any of the above embodiments. For example, the SIM card is connected with the controller, other units and both of them in the wireless communication device. Thus, by adopting a configuration in which the SIM card is included in the wireless communication device, authentication processing can be easily performed.

Thirteenth Embodiment

In the thirteenth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Fourteenth Embodiment

In the fourteenth embodiment, an LED unit is added to the configuration of the wireless communication device of the terminal (which may indicate the base station) according to any of the above embodiments. For example, the LED unit is connected to the controller, other units and both of them in the wireless communication device. Thus, by adopting a configuration in which the LED unit is included in the wireless communication device, notifying the operation state of the wireless communication device to the user can be easily done.

Fifteenth Embodiment

In the fifteenth embodiment, a vibrator unit is included in addition to the configuration of the wireless communication device wireless communication device of the terminal (which may indicate the base station) according to any of the above embodiments. For example, the vibrator unit is connected to at least one of the controller, other units and both of them in the wireless communication device. Thus, by adopting a configuration in which the vibrator unit is included in the wireless communication device, notifying the operation state of the wireless communication device to the user can be easily done.

Sixteenth Embodiment

In a sixteenth embodiment, the configuration of the wireless communication device includes a display in addition to the configuration of the wireless communication device (the wireless communication device of the terminal (which may indicate the base station) according to any one of the above h embodiments. The display may be connected to the controller, other units and both of them in the wireless communication device via a bus (not shown). As seen from the above, the configuration including the display to display the operation state of the wireless communication device on the display allows the operation status of the wireless communication device to be easily notified to a user.

Seventeenth Embodiment

In the present embodiment, [1] the frame type in the wireless communication system, [2] a technique of disconnection between wireless communication devices, [3] an access scheme of a wireless LAN system and [4] a frame interval of a wireless LAN are described.
[1] Frame Type in Communication System Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In the IEEE 802.11 standard, identification of a frame type is made based on two fields of Type and Subtype in the Frame Control field in the header part of the MAC frame. The Type field is one for generally identifying a data frame, a management frame or a control frame and the Subtype filed is one for identifying more detailed type in the identified-by-the Type frame type such as a Beacon frame belonging the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.
[2] Technique of Disconnection Between Wireless Communication Devices For disconnection, there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. The frame for disconnection may be referred to as "release frame" by the meaning of releasing connection, for example. Normally, it is determined that the connection is disconnected at the timing of transmitting the release frame in a wireless communication device on the side to transmit the release frame and at the timing of receiving the release frame in a wireless communication device on the side to receive the release frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the release frame cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in the IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of the IEEE802.11 wireless LAN is described. There are six types of frame intervals used in the IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in the IEEE802.11 wireless LAN, and a strict period from a previous frame is not discussed. Therefore, the definition is followed in the explanation of the IEEE802.11 wireless LAN system. In the IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In the IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 25:
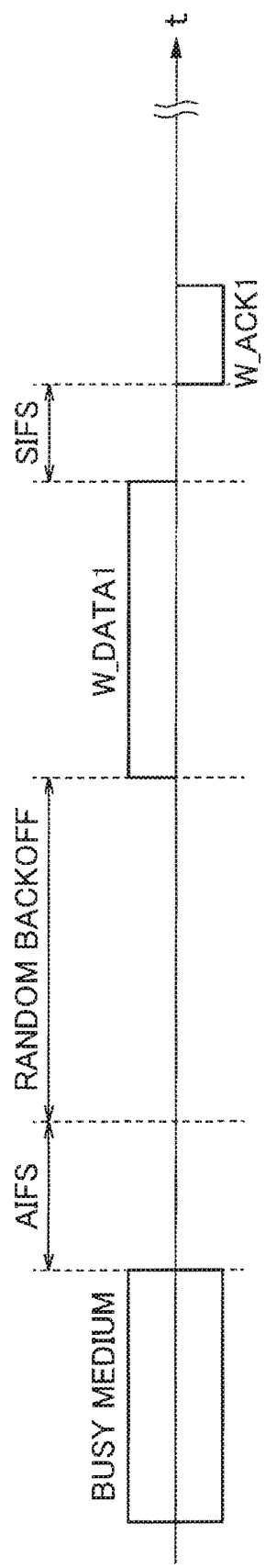
FIG. 25 is a diagram showing an example of frame exchange of a contention period.

Here, FIG. 25 illustrates one example of frame exchange in a competitive period based on the random access in the IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in the IEEE802.11 wireless LAN), the default values are defined.

For example, in the definition of 802.11ac, with an assumption that SIFS is 16 µs and the slot time is 9 is, and thereby PIFS is 25 µs, DIFS is 34 µs, the default value of the frame interval of an access category of BACKGROUND (AC_BK) in AIFS is 79 µs, the default value of the frame interval of BEST EFFORT (AC_BE) is 43 µs, the default value of the frame interval between VIDEO(AC_VI) and VOICE(AC_VO) is 34 µs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "memory" may encompass any electronic component which can store electronic information. The "memory" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, and magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The term "circuitry" may refer to not only electric circuits or a system of circuits used in a device but also a single electric circuit or a part of the single electric circuit.

Note that the frames described in the embodiments may indicate not only things called frames in, for example, the IEEE 802.11 standard, but also things called packets, such as Null Data Packets. When it is expressed that the base station transmits or receives a plurality of frames or a plurality of X-th frames, the frames or the X-th frames may be the same (for example, the same type or the same content) or may be different. An arbitrary value can be put into X according to the situation. The plurality of frames or the plurality of X-th frames may be transmitted or received at the same time or may be transmitted or received at temporally different timings. When it is expressed that a first frame, a second frame, and the like are transmitted or received at temporally different points, the expression of the first, the second, and the like is just an expression for distinguishing the frames, and the types and the content of the frames may be the same or different.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A wireless device comprising:
a receiver which receives a plurality of first frames during a first period;
a transmitter; and
processing circuitry which
    judges for each of the first frames whether a reception signal strength of the first frame is a first threshold or more, generates first state information indicating a busy state of a wireless medium when the reception signal strength of the first frame is the first threshold or more and generates second state information indicating an idle state of the wireless medium when the reception signal strength of the first frame is less than the first threshold,
    determines, when the first state information is generated for the first frame, whether a transmission source of the first frame belongs to the same wireless network as the wireless device, and
    changes a value of the first threshold based on reception signal strengths of first frames for which the first state information is generated and which are determined to belong to the same wireless network as the wireless device, wherein
the receiver receives a second frame after the first period, and
the processing circuitry judges whether a reception signal strength of the second frame is a second threshold or more wherein the second threshold is the changed value of the first threshold and the processing circuitry determines the second threshold based on a lowest reception signal strength among the reception signal strengths of the first frames for which the first state information is generated and which are determined to belong to the same wireless network,
the processing circuitry generates the first state information when the reception signal strength of the second frame is the second threshold or more, and generates the second state information when the reception signal strength of the second frame is less than the second threshold,
for each transmission interval of a third frame transmitted from a base station in the same wireless network, a third threshold and a fourth threshold greater than the third threshold are selectively applied, wherein the base station generates the first state information when a reception signal strength of a received frame is the third threshold or more and generates the second state information when the reception signal strength of the received frame is less than the third threshold in a transmission interval for which the third threshold is applied, and wherein the base station generates the first state information when a reception signal strength of a received frame is the fourth threshold or more and generates the second state information when the reception signal strength of the received frame is less than the fourth threshold in a transmission interval for which the fourth threshold is applied, and
the transmitter transmits a fourth frame for connection to the base station in the transmission interval in which the third threshold is applied.

2. The wireless device according to claim 1, wherein
the processing circuitry judges whether the transmission source of the first frame belongs to the same wireless network according to whether identification information of a wireless network that the wireless device belongs to is set in a first field of the first frame.

3. The wireless device according to claim 1, wherein
the processing circuitry determines the second threshold to a lowest reception signal strength among the reception signal strengths of the first frames determined to belong to the same wireless network.

4. The wireless device according to claim 1, wherein
the processing circuitry receives first information indicating the first period through the receiver and specifies the first period based on the first information.

5. The wireless device according to claim 1, wherein
the processing circuitry repeatedly executes a process of determining the second threshold at an interval of a constant time.

6. The wireless device according to claim 1, wherein
the receiver receives a fifth frame including information of a number of wireless devices belonging to the same wireless network and the processing circuitry starts a process of determining the second threshold based on the number of wireless devices or a change of the number of wireless devices.

7. The wireless device according to claim 1, wherein
the processing circuitry judges whether a transmission source of the first frame belongs to the same wireless network as the wireless device based on a physical header added to the first frame.

8. The wireless device according to claim 1, wherein
the processing circuitry determines the second threshold based on the reception signal strengths of the first frames having a predetermined type.

9. The wireless device according to claim 1, further comprising at least one antenna.

10. A wireless device comprising:
a receiver which receives a first frame;
a transmitter which transmits a second frame; and
processing circuitry which
    manages a number of other wireless devices belonging to the same wireless network as the wireless device, and
    according to the number of the other wireless devices, determines a length of a period of time during which a process of determining a threshold for judging a busy state or an idle state of a wireless medium is performed in the other wireless devices, wherein
the transmitter transmits the second frame including information indicating the length of the period to the other wireless devices belonging to the same wireless network, and
the information included in the second frame instructs the other wireless devices to receive a plurality of third frames during the period of time indicated by the information and to determine a value of the threshold based on a lowest reception signal strength of reception signal strengths of third frames for which the busy state is determined and whose transmission sources belong to the same wireless network,
the receiver receives a plurality of the fourth frames during a first period,
the processing circuitry
    judges for each of the fourth frames whether a reception signal strength of the fourth frame is a second threshold or more,
    generates first state information indicating the busy state of the wireless medium when the reception signal strength of the fourth frame is the second threshold or more and generates second state information indicating the idle state of the wireless medium when the reception signal strength of the fourth frame is less than the second threshold, determines, when the first state information is generated for the fourth frame, whether a transmission source of the fourth frame belongs to the same wireless network as the wireless device, and changes a value of the second threshold based on reception signal strengths of fourth frames determined to belong to the same wireless network, wherein the receiver receives a fifth frame after the first period, the processing circuitry judges whether a reception signal strength of the fifth frame is a third threshold or more, the third threshold being changed value of the second threshold, generates the first state information when the reception signal strength of the fifth frame is third threshold or more, and generates second state information when the reception signal strength of the fifth frame is less than the third threshold, the transmitter transmits a sixth frame at a transmission interval, the processing circuitry selectively applies one of the second threshold or the third threshold for each transmission interval of the sixth frame, and the transmitter transmits a seventh frame including information specifying which one of the second threshold and the third threshold is applied to each transmission interval.

11. The wireless device according to claim 10, wherein the transmitter transmits an eighth frame at an interval of a constant time, and the processing circuitry determines the length of the period to a value greater than a longest cycle of reception cycles of the eighth frame received by the other wireless devices.

12. The wireless device according to claim 10, wherein the processing circuitry calculates cycles of communication with the other wireless devices based on a history of communication with the other wireless devices and determines the length of the period to a value equal to or greater than a maximum cycle among cycles of communication with the other wireless devices.

13. The wireless device according to claim 10, wherein the transmitter transmits the second frame including the information of the number of the other wireless devices or a change in the number.

14. The wireless device according to claim 10, wherein the sixth frame is identical to the seventh frame.

15. The wireless device according to claim 10, further comprising at least one antenna.

16. A wireless communication method performed by a wireless communication terminal comprising:

receiving a plurality of first frames during a first period;

judging for each of the first frames whether a reception signal strength of the first frame is a first threshold or more, generating first state information indicating a busy state of a wireless medium when the reception signal strength of the first frame is the first threshold or more and generating second state information indicating an idle state of the wireless medium when the reception signal strength of the first frame is less than the first threshold;

determining, when the first state information is generated for the first frame, whether a transmission source of the first frame belongs to the same wireless network as the wireless communication terminal;

changing a value of the first threshold based on reception signal strengths of first frames for which the first state information is generated and which are determined to belong to the same wireless network as the wireless communication terminal;

receiving a second frame after the first period;

judging whether a reception signal strength of the second frame is a second threshold or more, the second threshold being the changed value of the first threshold, wherein the changing a value of the first threshold includes determining the second threshold based on a lowest reception signal strength among the reception signal strengths of the first frames for which the first state information is generated and which are determined to belong to the same wireless network; and generating the first state information when the reception signal strength of the second frame is the second threshold or more, and generating the second state information when the reception signal strength of the second frame is less than the second threshold, wherein for each transmission interval of a third frame transmitted from a base station in the same wireless network, a third threshold and a fourth threshold greater than the third threshold are selectively applied, wherein the base station generates the first state information when a reception signal strength of a received frame is the third threshold or more and generates the second state information when the reception signal strength of the received frame is less than the third threshold in a transmission interval for which the third threshold is applied, and wherein the base station generates the first state information when a reception signal strength of a received frame is the fourth threshold or more and generates the second state information when the reception signal strength of the received frame is less than the fourth threshold in a transmission interval for which the fourth threshold is applied, and the method comprises transmitting a fourth frame for connection to the base station in the transmission interval in which the third threshold is applied.

17. A wireless communication method performed by a wireless communication terminal comprising:

receiving a first frame;

transmitting a second frame;

managing a number of other wireless devices belonging to the same wireless network as the wireless communication terminal;

according to the number of the other wireless devices, determining a length of a period of time during which a process of determining a value of a threshold for judging a busy state or an idle state of a wireless medium is performed in the other wireless devices; and transmitting the second frame including information indicating the length of the period to the other wireless devices belonging to the same wireless network;

wherein the information included in the second frame instructs the other wireless devices to receive a plurality of third frames during the period of time indicated by the information and to determine a value of the threshold based on a lowest reception level of reception level strengths of third frames for which the busy state is determined and whose transmission sources belong to the same wireless network, the method comprises:

receiving a plurality of the fourth frames during a first period;

judging for each of the fourth frames whether a reception signal strength of the fourth frame is a second threshold or more;

generating first state information indicating the busy state of the wireless medium when the reception signal strength of the fourth frame is the second threshold or more and generating second state information indicating the idle state of the wireless medium when the reception signal strength of the fourth frame is less than the second threshold;

determining, when the first state information is generated for the fourth frame, whether a transmission source of the fourth frame belongs to the same wireless network as the wireless device;

changing a value of the second threshold based on reception signal strengths of fourth frames determined to belong to the same wireless network;

receiving a fifth frame after the first period;

judging whether a reception signal strength of the fifth frame is a third threshold or more, the third threshold being the changed value of the second threshold, generating the first state information when the reception signal strength of the fifth frame is the third threshold or more, and generating second state information when the reception signal strength of the fifth frame is less than the third threshold;

transmitting a sixth frame at a transmission interval;

selectively applying one of the second threshold or the third threshold for each transmission interval of the sixth frame; and transmitting a seventh frame including information specifying which one of the second threshold and the third threshold is applied to each transmission interval.

18. A wireless device comprising:

a receiver which receives a plurality of first frames during a first period; and processing circuitry which judges for each of the first frames whether a reception level of the first frame is a first threshold or more, generates first state information indicating a busy state of a wireless medium when the reception level of the first frame is the first threshold or more and generates second state information indicating an idle state of the wireless medium when the reception level of the first frame is less than the first threshold, determines, when the first state information is generated for the first frame, whether a transmission source of the first frame belongs to the same wireless network as the wireless device, and changes a value of the first threshold based on reception levels of first frames determined to belong to the same wireless network as the wireless device, wherein the receiver receives a second frame after the first period, the processing circuitry judges whether a reception level of the second frame is a second threshold or more wherein the second threshold is the changed value of the first threshold, generates the first state information when the reception level of the second frame is the second threshold or more, and generates the second state information when the reception level of the second frame is less than the second threshold, for each transmission interval of a fifth frame transmitted from a base station in the same wireless network, a third threshold and a fourth threshold greater than the third threshold are selectively applied, wherein the base station generates the first state information when a reception level of a received frame is the third threshold or more and generates the second state information when the reception level of the received frame is less than the third threshold in a transmission interval for which the third threshold is applied, and wherein the base station generates the first state information when a reception level of a received frame is the fourth threshold or more and generates the second state information when the reception level of the received frame is less than the fourth threshold in a transmission interval for which the fourth threshold is applied, and the wireless device comprises a transmitter which transmits a sixth frame for connection to the base station in the transmission interval in which the third threshold is applied.

19. A wireless device comprising:

a receiver which receives a first frame;

a transmitter which transmits a second frame; and processing circuitry which manages a number of other wireless devices belonging to the same wireless network as the wireless device, and according to the number of the other wireless devices, determines a length of a period of time during which a process of determining a threshold for judging a busy state or an idle state of a wireless medium is performed in the other wireless devices, wherein the transmitter transmits the second frame including information indicating the length of the period to the other wireless devices belonging to the same wireless network, the information included in the second frame instructs the other wireless devices to receive a plurality of third frames during the period of time indicated by the information and to determine a value of the threshold based on reception levels of third frames whose transmission sources belong to the same wireless network, the receiver receives a plurality of fifth frames during a first period, the processing circuitry judges for each of the fifth frames whether a reception level of the fifth frame is a second threshold or more, generates first state information indicating to the busy state when the reception level of the fifth frame is the second threshold or more and generates second state information indicating the idle state of the wireless medium when the reception level of the fifth frame is less than the second threshold, determines, when the first state information is generated for the fifth frame, whether a transmission source of the fifth frame belongs to the same wireless network as the wireless device, and changes a value of the second threshold based on reception levels of fifth frames determined to belong to the same wireless network, wherein the receiver receives a sixth frame after the first period, the processing circuitry judges whether a reception level of the sixth frame is a third threshold or more, the third threshold being the changed value of the second threshold, generates the first state information when the reception level of the sixth frame is the third threshold or more, and generates second state information when the reception level of the sixth frame is less than the third threshold, the transmitter transmits a seventh frame at a transmission interval,
the processing circuitry selectively applies one of the second threshold or the third threshold for each transmission interval of the seventh frame, and
the transmitter transmits an eighth frame including information specifying which one of the second threshold and the third threshold is applied to each transmission interval.

\* \* \* \* \*